US010279912B2

(12) United States Patent
Robinson et al.

(10) Patent No.: US 10,279,912 B2
(45) Date of Patent: May 7, 2019

(54) PASSENGER SEATING WITH PARTITION ASSEMBLY

(71) Applicant: Thompson Aero Seating Limited, Craigavon, Co Armagh (GB)

(72) Inventors: Aaron Robinson, Craigavon (GB); David Glenny, Kilkeel (GB)

(73) Assignee: Thompson Aero Seating Limited, Craigavon, County Armagh (GB)

( * ) Notice: Subject to any disclaimer, the term of this patent is extended or adjusted under 35 U.S.C. 154(b) by 0 days.

(21) Appl. No.: 15/788,155

(22) Filed: Oct. 19, 2017

(65) Prior Publication Data
US 2018/0105273 A1 Apr. 19, 2018

(30) Foreign Application Priority Data
Oct. 19, 2016 (GB) .................................. 1617686.9

(51) Int. Cl.
*B64D 11/06* (2006.01)

(52) U.S. Cl.
CPC ...... *B64D 11/0606* (2014.12); *B64D 11/0605* (2014.12); *E05Y 2900/142* (2013.01)

(58) Field of Classification Search
CPC ............ B64D 11/0606; B64D 11/0605; B64D 11/0023; B64D 11/06; E05Y 2900/142; E05Y 2900/132; E05Y 2900/502; E05D 15/1005
USPC ................................... 297/217.1; 244/122 R
See application file for complete search history.

(56) References Cited

U.S. PATENT DOCUMENTS

| 4,185,799 A * | 1/1980 | Richards, Jr. ............. B64C 1/20 244/118.5 |
| 2007/0295862 A1* | 12/2007 | Hupperich ......... B64D 11/0023 244/118.5 |
| 2013/0241247 A1* | 9/2013 | Wallace ................. B64D 11/06 297/118 |
| 2014/0035330 A1* | 2/2014 | Henshaw ............... B60N 3/002 297/174 R |
| 2014/0361585 A1* | 12/2014 | Henshaw ................. B60N 2/01 297/174 R |
| 2016/0298370 A1* | 10/2016 | Druckman ......... B64D 11/0606 |
| 2016/0368608 A1* | 12/2016 | Suzuki ............... B64D 11/0606 |
| 2017/0088267 A1* | 3/2017 | Dowty ............. B64D 11/00153 |
| 2017/0225787 A1* | 8/2017 | Schliwa ................. B64D 11/00 |
| 2017/0283061 A1* | 10/2017 | Papke ................ B64D 11/0606 |

(Continued)

FOREIGN PATENT DOCUMENTS

| GB | 2433433 | 6/2007 |
| GB | 2514094 | 11/2014 |
| WO | 2005/080196 | 9/2005 |

*Primary Examiner* — Mark R Wendell
(74) *Attorney, Agent, or Firm* — Gardner, Linn, Burkhart & Ondersma LLP

(57) ABSTRACT

A passenger seating arrangement includes at least one seating row, the (or each) row including at least a first seat located beside a second seat or an aisle and a partition assembly located between the first and second seats, or between the first seat and the aisle. The partition assembly includes a partition wall located between the first and second seats, or between the first seat and the aisle. The wall defines an opening and a screen is slidably movable with respect to the wall between an open state in which the opening is exposed by the screen, and a closed state in which the opening is closed by the screen.

20 Claims, 25 Drawing Sheets

(56) References Cited

U.S. PATENT DOCUMENTS

2018/0022457 A1\* 1/2018 Papke ................ B64D 11/0023
244/118.6

\* cited by examiner

PASSENGER SEATING WITH PARTITION ASSEMBLY

FIELD OF THE INVENTION

The present invention relates to passenger seating, such as for aircraft. The invention relates particularly to passenger seating incorporating a partition assembly for passenger privacy.

BACKGROUND OF THE INVENTION

Privacy is a common problem in vehicles in which multiple persons are seated beside one another. This problem is particularly prevalent in business or first class seating, where a seat occupant may wish to sleep or work or pursue any other sole activity whilst having privacy from neighbouring passengers and adjacent aisle(s).

It is common for seating arrangements in business class or first class to include a shell structure which partially surrounds the seat whilst providing access to an aisle; however this shell prevents interaction between the seat occupant and the occupant of an adjacent seat, which may not always be desirable. Therefore it would be desirable to provide passenger seating which gives a seat occupant the option of interaction with occupants of adjacent seats or aisles whilst still providing a high degree of privacy.

SUMMARY OF THE INVENTION

In one form of the present invention, a passenger seating arrangement includes at least one row of seats, the (or each) row having at least a first seat located beside a second seat and a partition assembly located between the first and second seats, wherein the partition assembly includes a partition wall located between the first and second seats, the wall including an opening; and a screen that is slidably movable with respect to the wall between an open state in which the opening is exposed by the screen, and a closed state in which the opening is closed by the screen.

In one aspect, the partition wall extends perpendicular to the floor upon which the seating is mounted.

Optionally, the partition wall extends to at least the height of the top of the seats.

In another aspect, the partition wall includes an upper portion and a base portion.

In yet another aspect, the opening is provided in the upper portion.

In a further aspect, the upper portion includes a first upper wall section adjacent the opening which provides the forward part of the upper portion of the partition wall.

Optionally, the upper portion further include a second upper wall section which lies adjacent the opening and which provides the rear part of the upper portion of the partition wall.

In still another aspect, the opposing end faces of the first and second upper wall sections are separated by a base wall which extends therebetween.

In a further aspect, the opening is defined by the gap extending between the opposing end faces of the first and second upper wall sections which is bounded by the base wall.

Optionally, the opening is substantially u-shaped.

Optionally, the screen slides in a direction that is parallel with the direction in which a seated passenger faces.

In another aspect, the slidable movement with respect to the partition wall comprises movement on rollers or wheels or rails or any other suitable slidable arrangement.

Optionally, the screen is telescopically arranged with the first upper wall section such that it fits around the upper wall section.

In another aspect, the screen is slidable along the base wall.

Optionally, the upper portion incorporates a guide portion upon which the screen slides along.

In another aspect, the guide portion is provided on the base wall.

Optionally, the guide portion includes an elongate protrusion which extends along at least part of the base wall, which has a thinner cross section than the upper portion such that the screen when transitioning there along surrounds the guide portion.

In another aspect, the guide portion includes a square or rectangular or hexagonal or any other suitable shape in cross section.

Optionally, the partition assembly includes an actuation means for moving the screen from the open state to the closed state and/or the closed state to the open state.

In another aspect, the actuation means is incorporated within first upper wall section and, at least in part, within the screen.

Optionally, the actuation means is in the form of an extendible actuator such as a hydraulic ram, gas spring or mechanical spring.

Optionally, the actuator is biased to adopt its extended state, e.g. by hydraulic, gas, mechanical or other resilient biasing means.

In another aspect, the actuator is incorporated into an extendible linkage whereby extension of the actuator extends the linkage to slide the screen forward such that it adopts the closed state.

Optionally, the linkage is pivotably coupled to the interior of the first upper wall section and the screen.

In another aspect, a user operable control is provided upon the seating which is configured to vary the partition assembly between the open and closed states.

Optionally, the user operable control is located upon both sides of the partition wall.

In another aspect, the user operable control is coupled to a locking apparatus which is configured to retain the partition assembly in the open and/or closed states.

Optionally, the locking apparatus includes at least one latch which is configured to extend from the base wall.

In another aspect, the latches extend from the base wall in a direction which is perpendicular to the direction of the slidable movement of the screen.

Optionally, the latches are configured to selectively engage the screen with one or more recesses being located on the underside of the screen within which the latches may engage when in the engaged state.

In another aspect, there are at least two recesses provided upon the underside of the screen, which are located at opposing ends thereof.

Optionally, the user operable control is configured to vary the latches between engaged and retracted sates.

In another aspect, the user operable control is coupled mechanically to the latches by a latch operating mechanism.

Optionally, the latch operating mechanism includes a lever that is pivotable by the user operable control, which is configured to engage or retract the latches.

In another aspect the latch operating mechanism is biased such that the latches adopt their engaged states e.g. by hydraulic, gas, mechanical or other resilient biasing means.

Optionally, the user operable control includes a pivoting catch, which is configured to engage a pivoting member which is in turn coupled via a rod or other suitable mechanical linkage to the lever.

In another aspect, the pivoting member is configured to move such as to vary the position of the rod such that the lever adopts the engaged or retracted states.

Optionally, the rod is biased towards the engaged state via one or more resilient biasing means which are typically coupled to an upper wall of the locking apparatus.

In another aspect the rod is slidably coupled to the lever at one end and fixedly coupled to the pivoting member at the opposing end.

Optionally, the pivoting member is shaped and dimensioned to incorporate one or more apertures, within which at least part of the user operable control, optionally, the pivoting catch may displace.

In another aspect, wherein upon actuation of the user operable control, the pivoting catch is configured to displace whereupon it may abut a wall defined within the pivoting member by the aperture, the pivoting member being configured to pivot along a horizontal axis.

Optionally, the rod is configured to reciprocally displace in conjunction with the pivoting member such as to vary the lever and latches between engaged and retracted states.

Optionally, wherein the respective seat is located within a shell structure, the partition assembly forming part of the shell structure.

Other various features are recited in the dependent claims appended hereto.

These and other objects, advantages and features of the invention will become apparent upon review of the following specification in conjunction with the drawings.

BRIEF DESCRIPTION OF THE DRAWINGS

Embodiments of the invention are now described with reference to the accompanying drawings in which like numerals are used to denote like parts and in which.

DETAILED DESCRIPTION OF THE PREFERRED EMBODIMENTS

Figure 1:
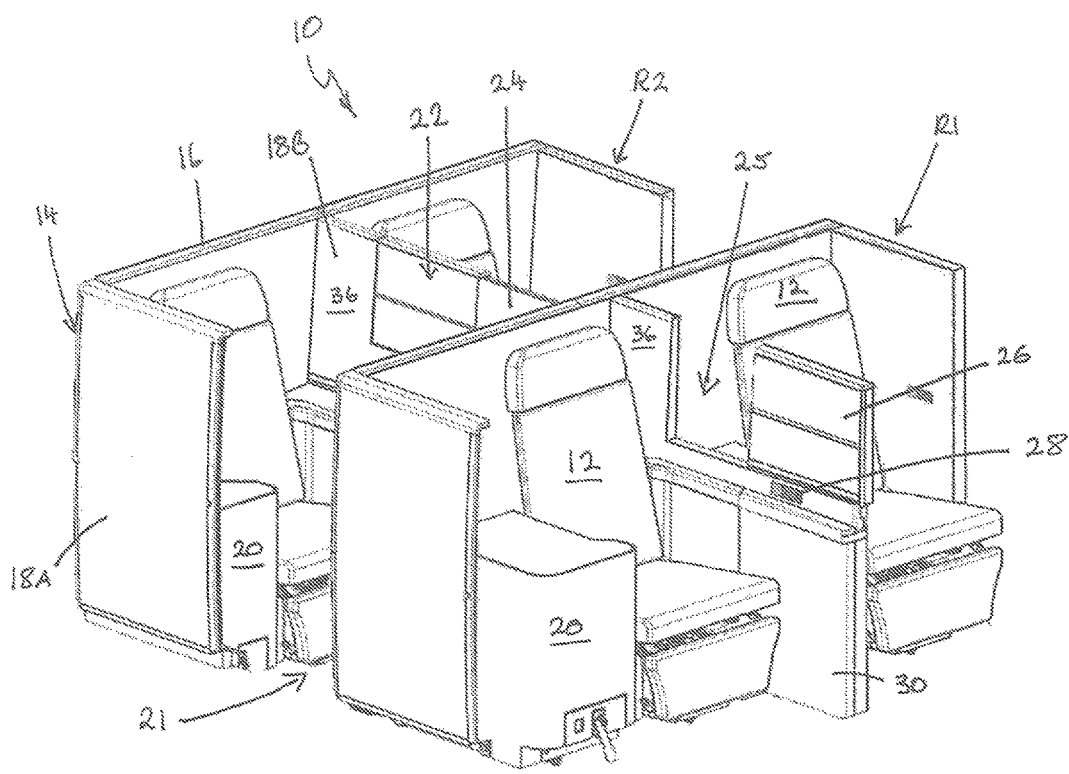
FIG. 1 is a front perspective view of passenger seating, in particular aircraft seating, incorporating two instances of a partition assembly embodying the invention, each partition assembly being shown between a respective two adjacent seats in a respective row.

Referring now to the drawings there is shown, generally indicated as 10, passenger seating embodying one aspect of the invention. Passenger seating embodying the invention is particularly suitable for use in vehicles (e.g. aircraft, boats, trains and buses) where the seating is located in a common passenger area, for example an aircraft cabin, having one or more aisles running alongside the seating. In some preferred embodiments, the seating 10 is aircraft seating and is located, in use, in an aircraft cabin (not shown).

In the following description, it is assumed that a seated passenger faces in a forward direction and so terms such as forward, front, rearward, rear and fore-and-aft are intended to be construed accordingly. The term "vertical" is intended to mean perpendicular to the surface on which the seating is located in use.

Figure 2:
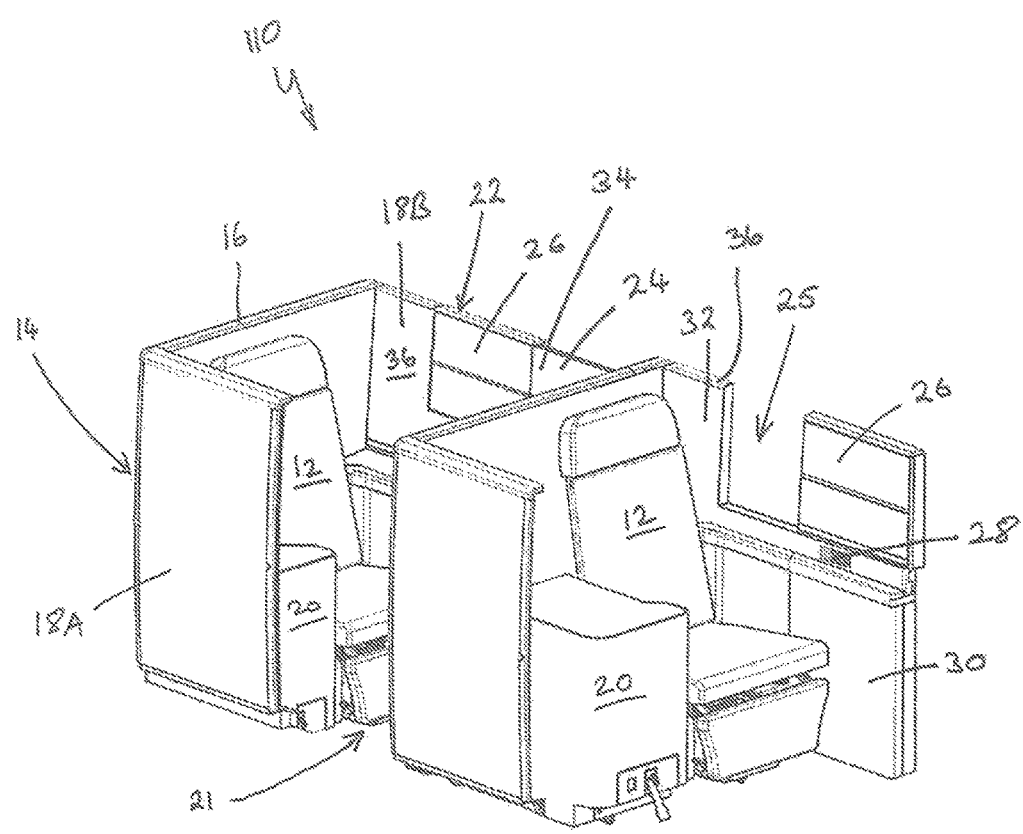
FIG. 2 is a front perspective view of front perspective view of an alternative arrangement of passenger seating, in particular aircraft seating, incorporating two instances of a partition assembly embodying the invention, each partition assembly being shown at the side of a respective seat at the end of a respective row.

The seating 10 includes at least one seat 12, usually a plurality of seats 12 arranged in an array of one or more rows R1, R2, each row having one or more seats 12. In FIG. 1, two rows R1, R2 each with first and second respective adjacent seats 12 are shown by way of example. Hence, at the rear of the seating 10 and/or in front and/or to the side of it there may be provided more seating (e.g. additional row(s) of seat(s) 12). In one embodiment one or more additional seats 12 are located beside each seat 12 (as shown in FIG. 1). When the seating is installed in a cabin, a bulkhead (not shown) may be located in front of and/or behind the seating 10. When the seating 10 is located in a cabin, an aisle is typically located alongside the seating 10 on one or both sides, typically running substantially perpendicular with the rows R1, R2. The, or each, aisle may separate the seating 10 from additional seating (not shown but which may be the same as the seating 10), bulkhead or cabin wall (not shown). FIG. 2 shows an alternative arrangement of seating 110 in which each row has only one seat 12.

Each seat 12 is typically located within a shell structure 14 that partially surrounds the seat 12. The shell structure 14 typically includes a back portion 16 behind the seat 12 and at least one side portion 18. At at least one side of the seat 12, the side portion 18 may include a console 20, which may be configured to serve as an armrest and/or may include a deployable table and/or other facilities. The shell structure 14 may be shared by more than one seat 12 of the same row R1, R2, for example the shell structure 14 may be configured to provide the back portion 16 or side portion(s) for each seat 12 in the respective row. In the example of FIG. 1 each row R1, R2 has a respective shell structure 14 configured to provide a respective back portion 16, a respective near side 18A including a side console 20, and a respective far side 18B for the seat 12 in the respective row R1, R2. Where each row R1, R2 has more than one seat 12, a partition assembly 22 and/or a console 20 separating adjacent seats in a row is provided, conveniently as part of a common shell for the row. The seats 12 are typically of a type that can recline to form a bed. Optionally, for a seat 12 at the end of a row, a partition assembly may be provided at the end of the row at the side of the end seat 12, as is illustrated in the seating 10 of FIG. 2, i.e. the partition assembly does not necessarily have to be provided between adjacent seats.

The shell structure 14 provides a seated passenger (not shown) with some privacy from other passengers seated in the same row and in adjacent rows. However, the shell structure 14 usually must allow space for passengers to access the seat 12 from an aisle and vice versa. Accordingly, the side portion 18A that is, in use, adjacent an aisle is configured to provide a gap 21 for ingress to and egress from the end seat 12 in the respective row. In typical embodiments, this means that the side portion 18A does not extend fully and permanently to the shell structure 14 of the row in front, or to a bulkhead in front, as applicable. This is in contrast to the far side portion 18B which may extend fully and permanently to the to shell structure 14 of the row in front, or to a bulkhead in front, as applicable. In this example it is assumed that when the seating 10, 110 is installed, access to the seat 12 is not required from beyond the far side 18B. In the case of the seating 10 this is because another seat is located beyond the side 18B, while in the case of the seating 110 there may be a structure such as a cabin wall or a bulkhead beyond the side 18B.

The partition assembly 22 is typically included within the shell structure 14, forming part of the shell structure 14. In one embodiment the passenger seating 10 includes at least one row of seats R1, with the (or each) row having at least a first seat 12 located beside a second seat 12 with a partition assembly 22 located between the first and second seats 12. The partition assembly 22 includes a partition wall 24, which is located between the first and second seats 12. Typically the partition wall 24 provides at least part of the side wall 18B. The partition wall 24 includes an opening 25, which allows for communication and/or interaction between the occupants of the first and second seats 12. The partition wall 24 further includes a screen 26 that is slidably movable with respect to the partition wall 24 between an open state in which the opening 25 is exposed by the screen 26, and a closed state in which the opening 25 is closed by the screen 26. Advantageously this allows the occupant of either the first or second seat 12 to interact with the occupant of the adjacent seat or to have privacy depending on whether the screen is open or closed. The screen 26 slides in a direction that is parallel with the direction in which a seated passenger faces. In various preferred embodiments adjacent seats 12 face in the same direction. In alternative embodiments adjacent seats 12 may face in opposite directions. The sliding movement of the partition wall 24 may be facilitate by rollers or wheels or rail(s) or any other suitable mechanism.

The partition wall 24 provides a vertical barrier between the first and second seats 12, or between a seat at the end of a row and whatever is beyond the row. The wall extends perpendicular to the floor on which the seating 10,110 is installed mounted. It is generally preferred that the partition wall 24 extends to at least the height of the top of the seat(s) 12 to ensure the privacy of the occupant(s) of the seat(s) 12. It also may be preferred that the wall 24 extends fully along the side of the respective seats 12, e.g. from the back portion 16 of one row to the back portion 16 of the next, or to a bulkhead as applicable.

The partition wall 24 typically includes a base portion 30 and an upper portion 32, the opening 25 being provided in the upper portion 32. The base portion 30 typically extends to approximately arm rest level, or at least the upper portion 32 is above arm rest level (as shown in FIGS. 1 and 2). The base portion 30 may have a console and/or an armrest. The upper portion 32 includes a first upper wall section 34 adjacent the opening 25, which in some preferred embodiments provides a forward part of the upper portion 32 of the partition wall 24, i.e. the opening 25 is located rearwardly of the first upper wall section 34. The upper portion 32 may include a second upper wall section 36 adjacent the opening 25, which in some embodiments provides a rear part of the upper portion 32 of the partition wall 24, i.e. the opening 25 is located forwardly of second upper wall section 36. The first and second upper wall sections 34, 36 are provided on a base wall 38. The opening 25 is defined by the gap defined between the first and second upper wall sections 34, 36 and by the base wall 38, the base wall 38 including part of the upper portion 32. In alternative embodiments the first second wall section 36 may be omitted, in which case the opening 25 is defined between the remaining wall section 34 and the back 16 of shell 14 or a bulkhead as applicable. In alternative embodiments the arrangement of the upper portion 32 may be reversed so that the opening 25 is forward of the first wall section 34 (and rearwardly of the second wall section 34 when present).

Figure 3:
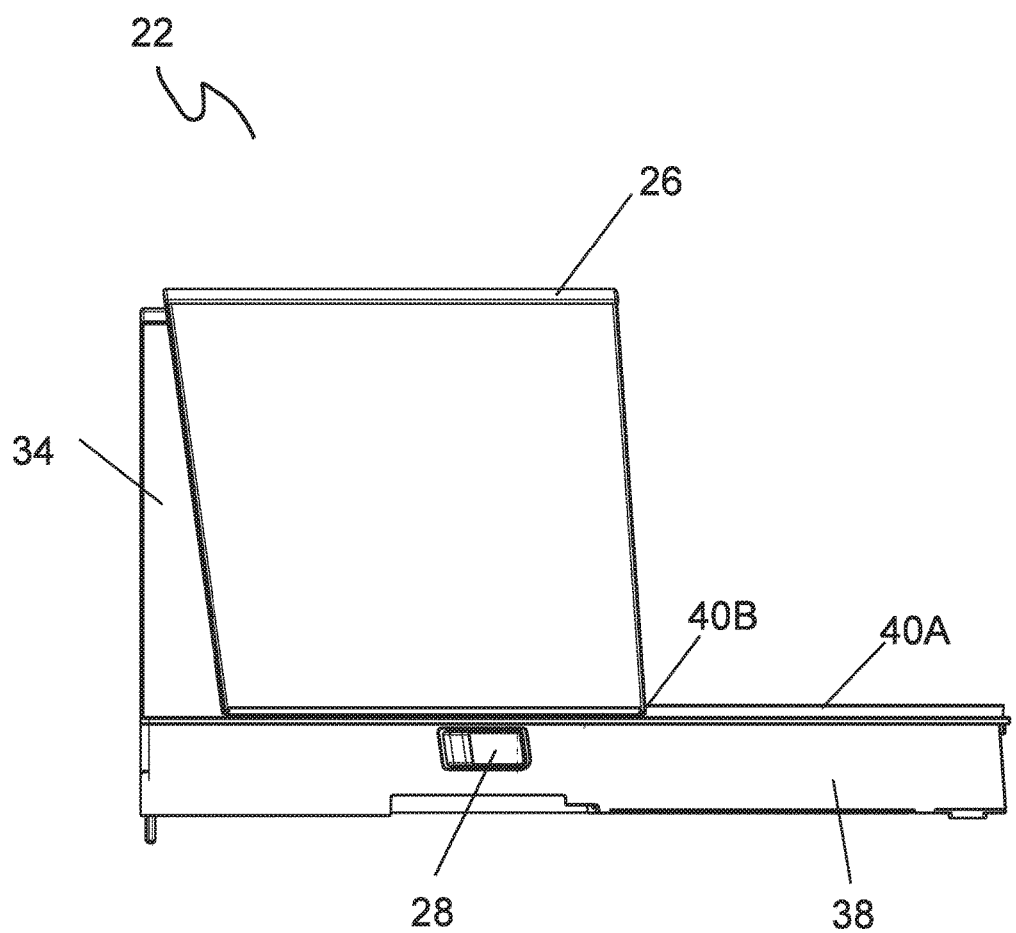
FIG. 3 is a side view of the partition assembly shown in an open state.
Figure 4:
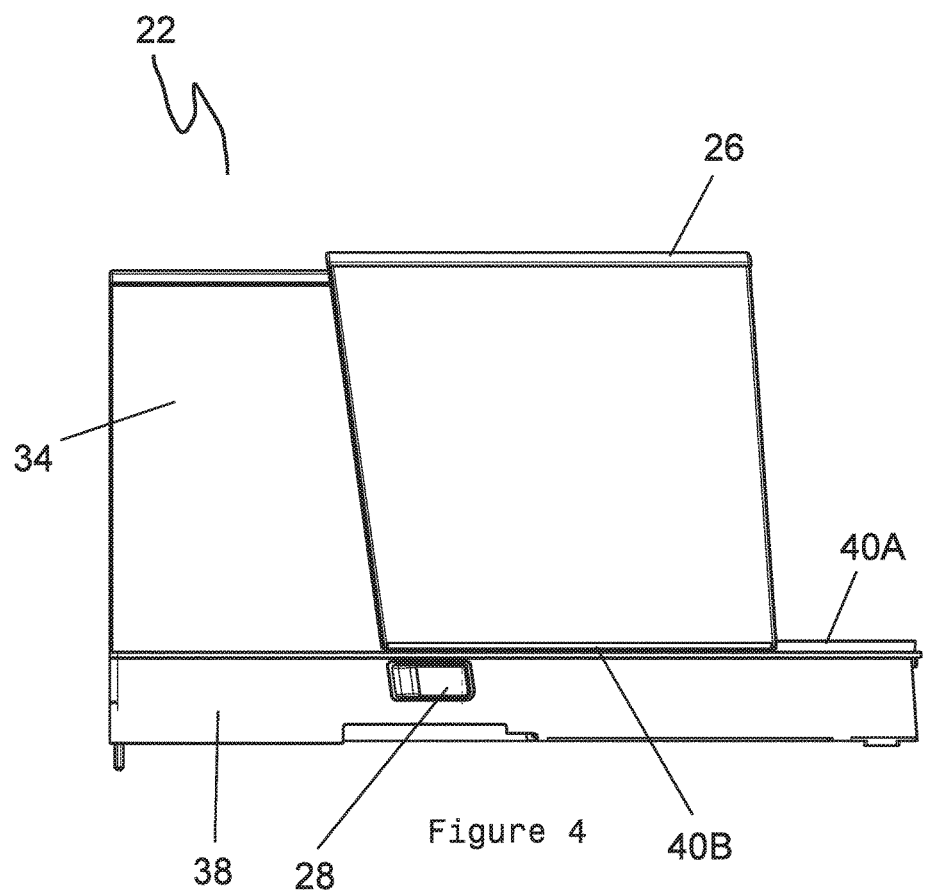
FIG. 4 is a side view of the partition assembly shown in a partially open (or partially closed) state.
Figure 5:
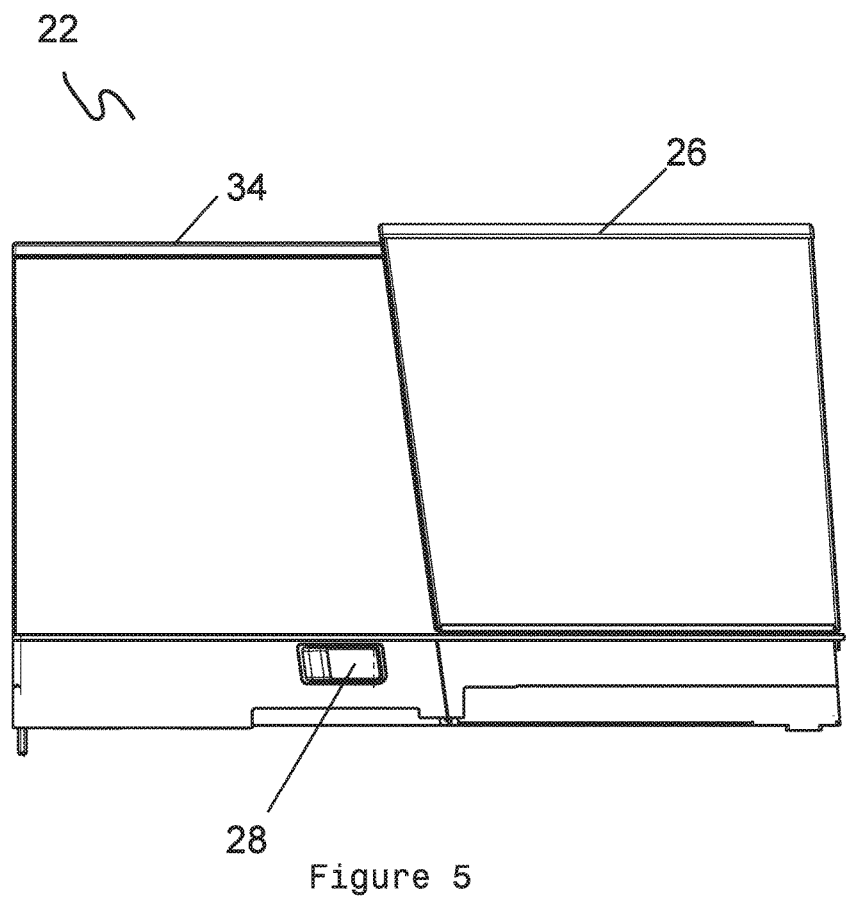
FIG. 5 is a side view of the partition assembly shown in a closed state.
Figure 6:
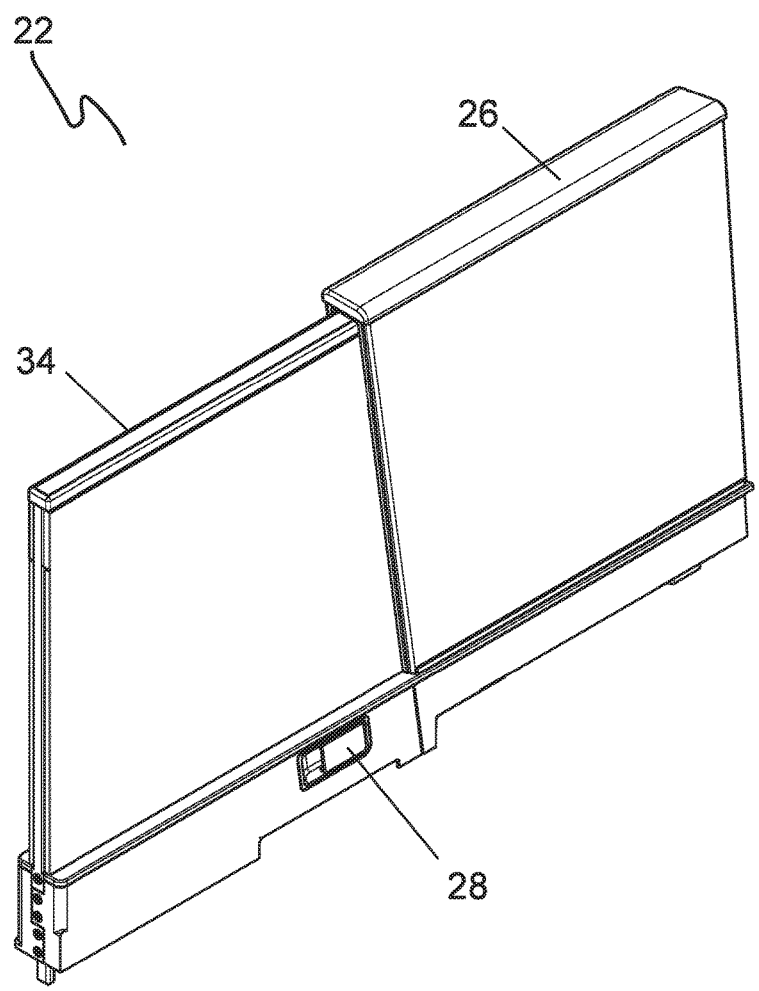
FIG. 6 is a rear perspective view of the partition assembly shown in the closed state.
Figure 7:
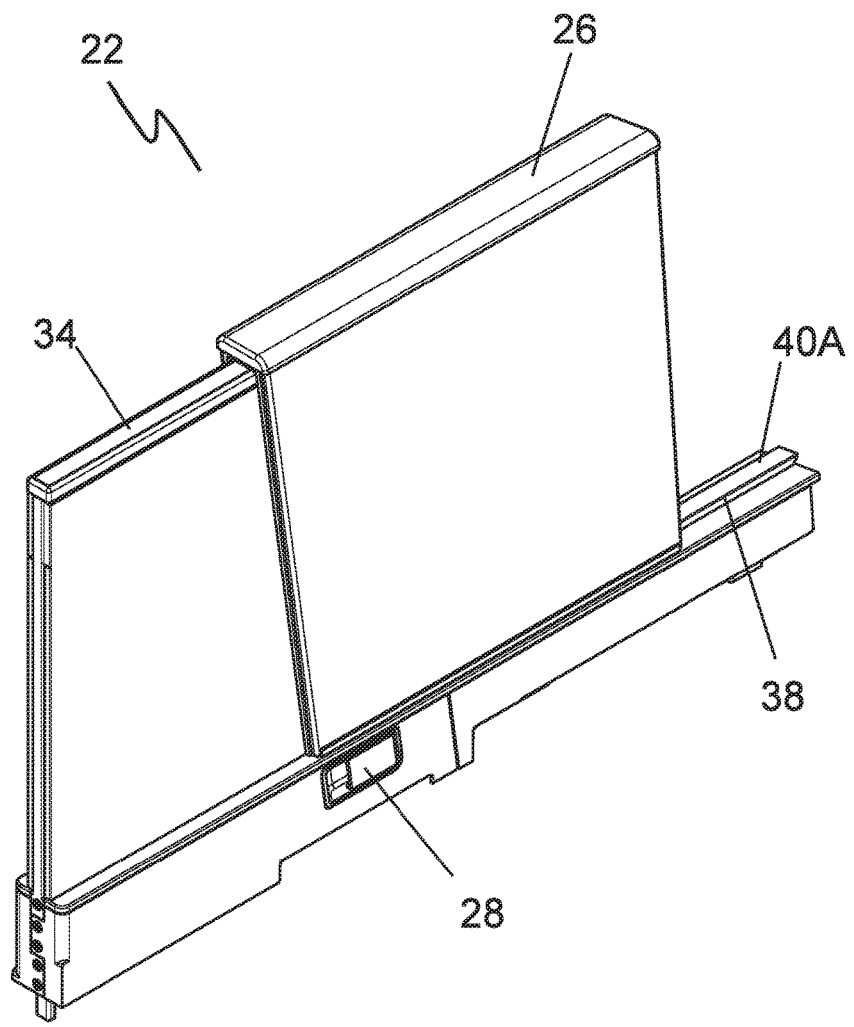
FIG. 7 is a rear perspective view of the partition assembly shown in the partially open (or partially closed) state.
Figure 8:
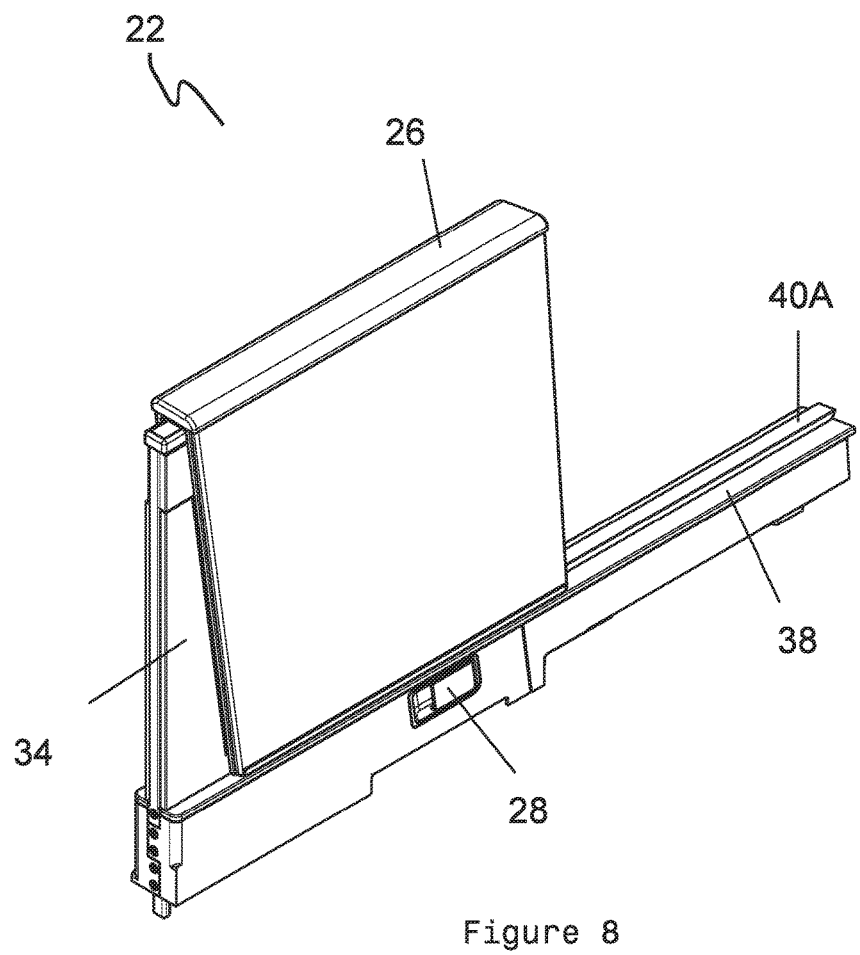
FIG. 8 is a rear perspective view of the partition assembly shown in the open state.
Figure 9A:
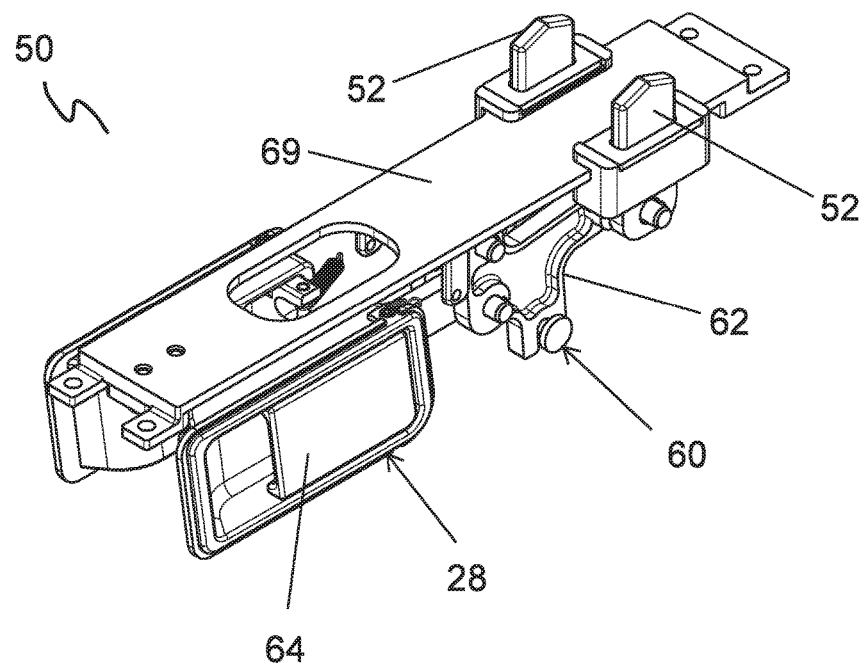
FIG. 9A is a rear perspective view of a locking apparatus of the partition assembly in a locking state.
Figure 9B:
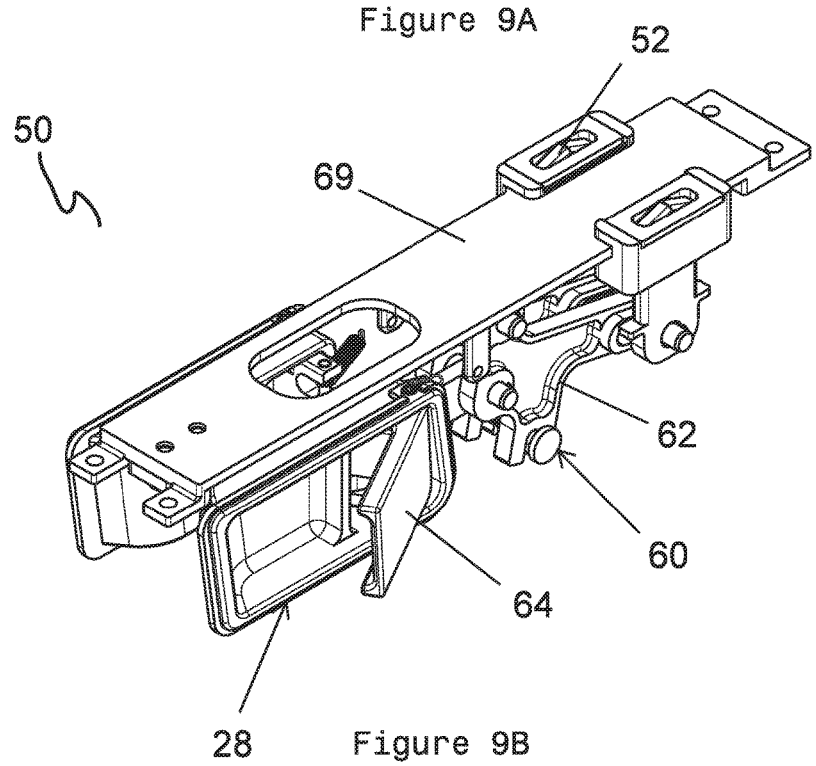
FIG. 9B is a rear perspective view of the locking apparatus of the partition assembly in a non-locking state.
Figure 9C:
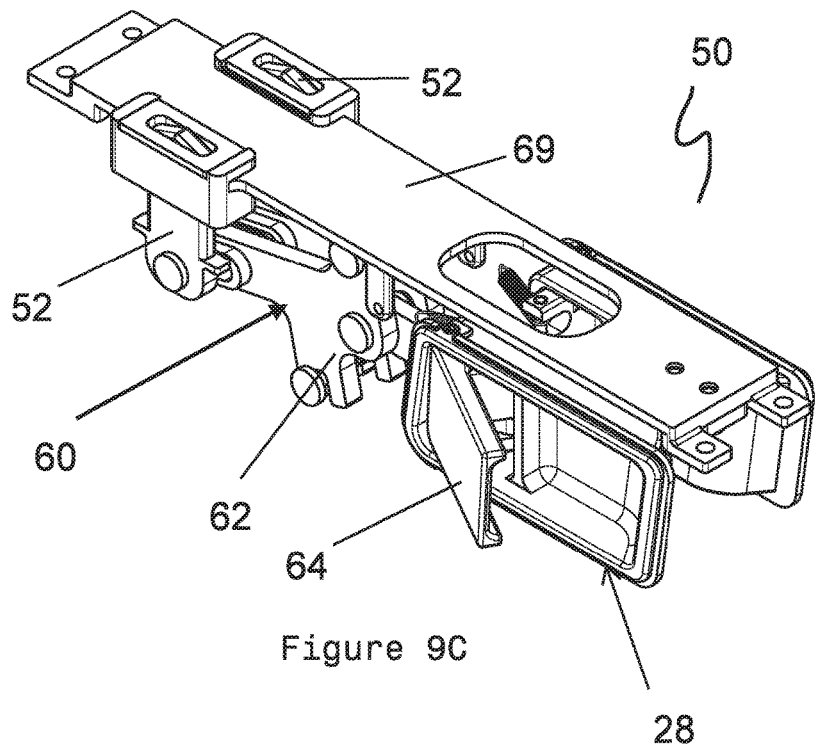
FIG. 9C is an alternative rear perspective view of the locking apparatus of the partition assembly in the non-locking state.
Figure 10A:
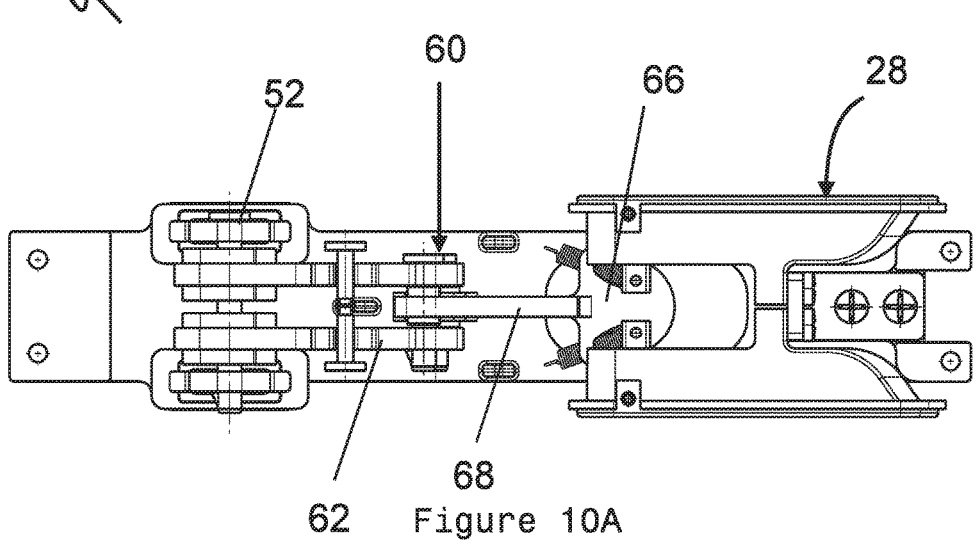
FIG. 10A is a bottom plan view of the locking apparatus of the partition assembly in the locking state.
Figure 10B:
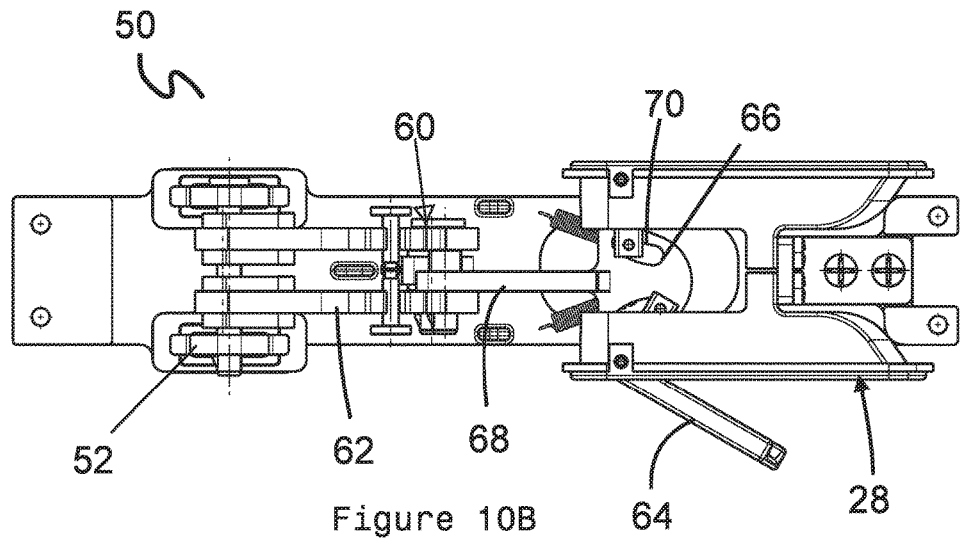
FIG. 10B is a bottom plan view of the locking apparatus of the partition assembly in the non-locking state.
Figure 10C:
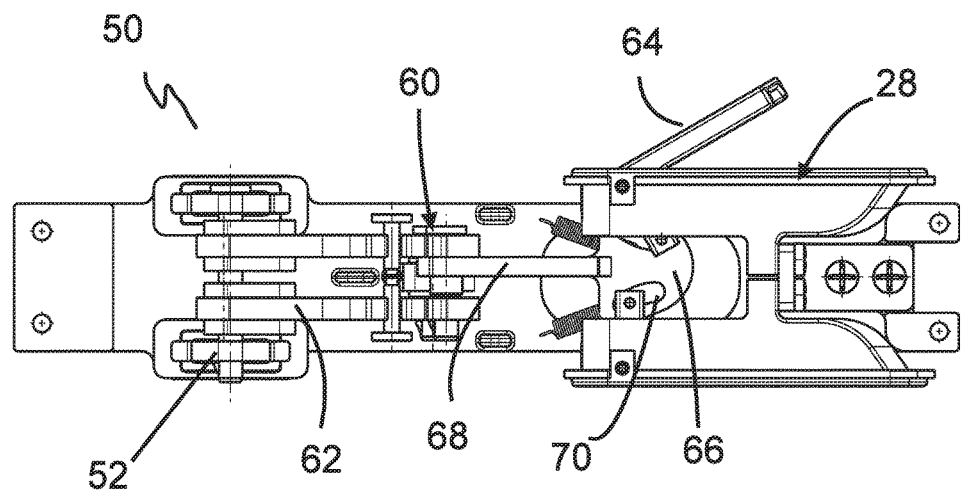
FIG. 10C is a bottom plan view of the locking apparatus of the partition assembly in the non-locking state.
Figure 11A:
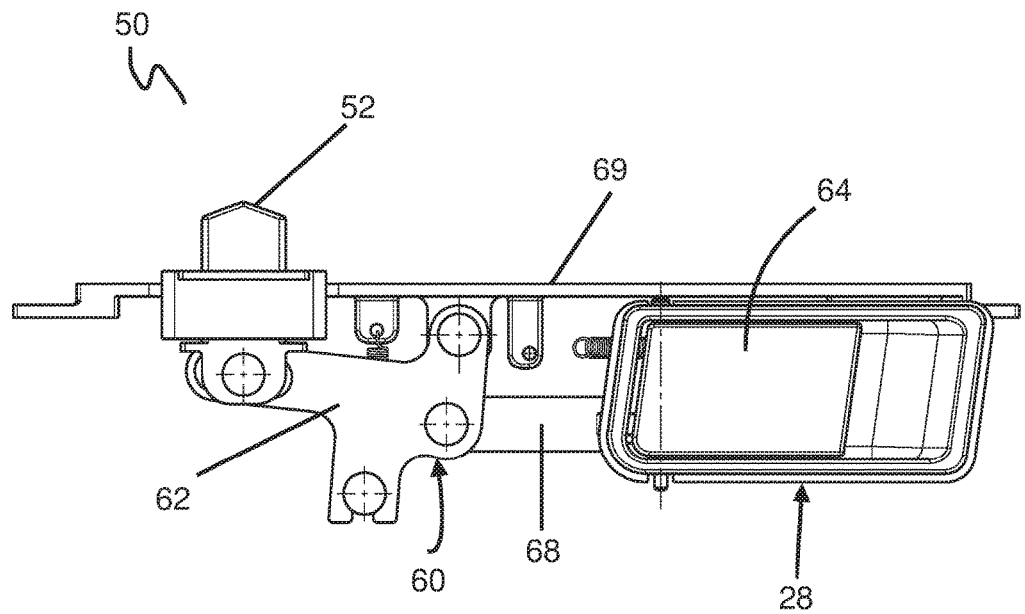
FIG. 11A is a side view of the locking apparatus in the locking state.
Figure 11B:
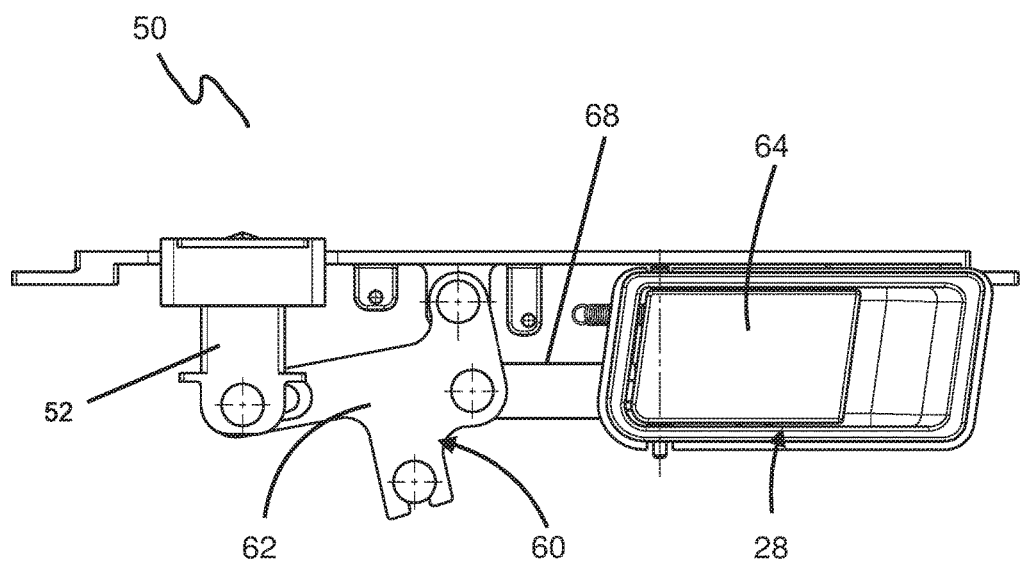
FIG. 11B is a side view of the locking apparatus in the non-locking state.
Figure 11C:
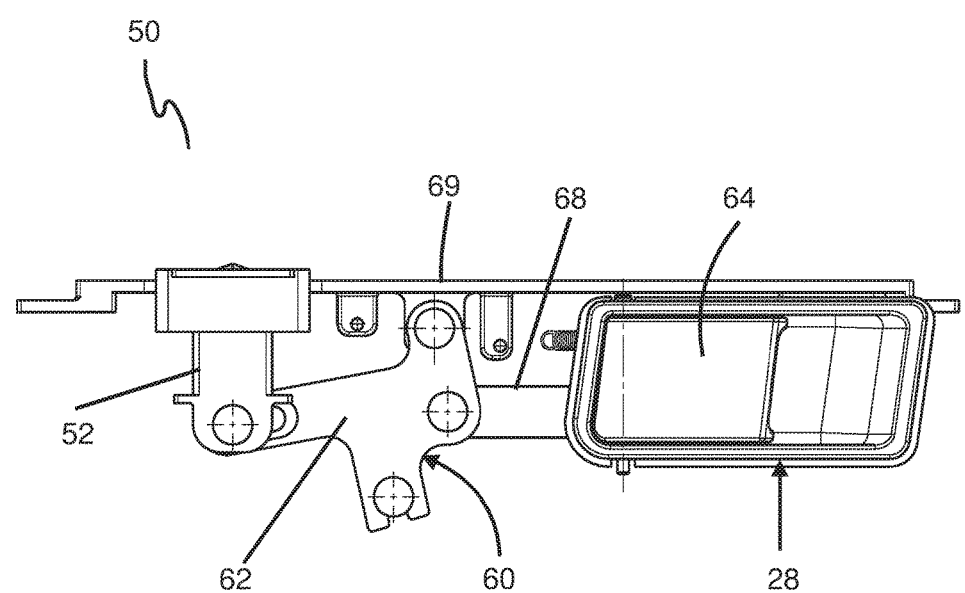
FIG. 11C is an alternative side view of the locking apparatus in the non-locking state.
Figure 12:
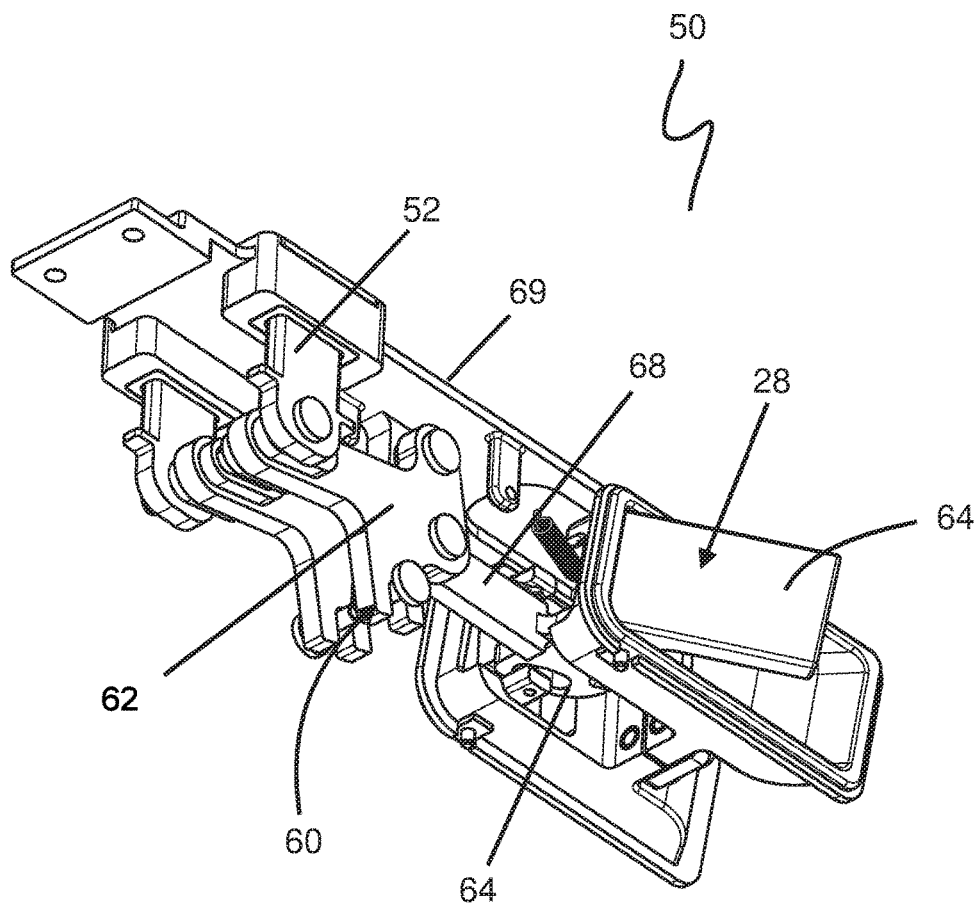
FIG. 12 is a bottom perspective view of the locking apparatus in the non-locking state.
Figure 13:
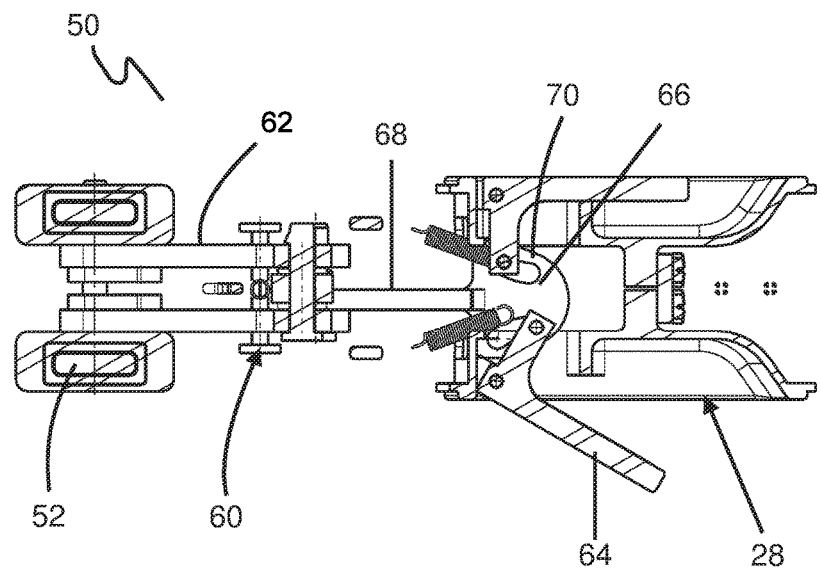
FIG. 13 is a bottom sectional view of the locking apparatus in the non-locking state.
Figure 14:
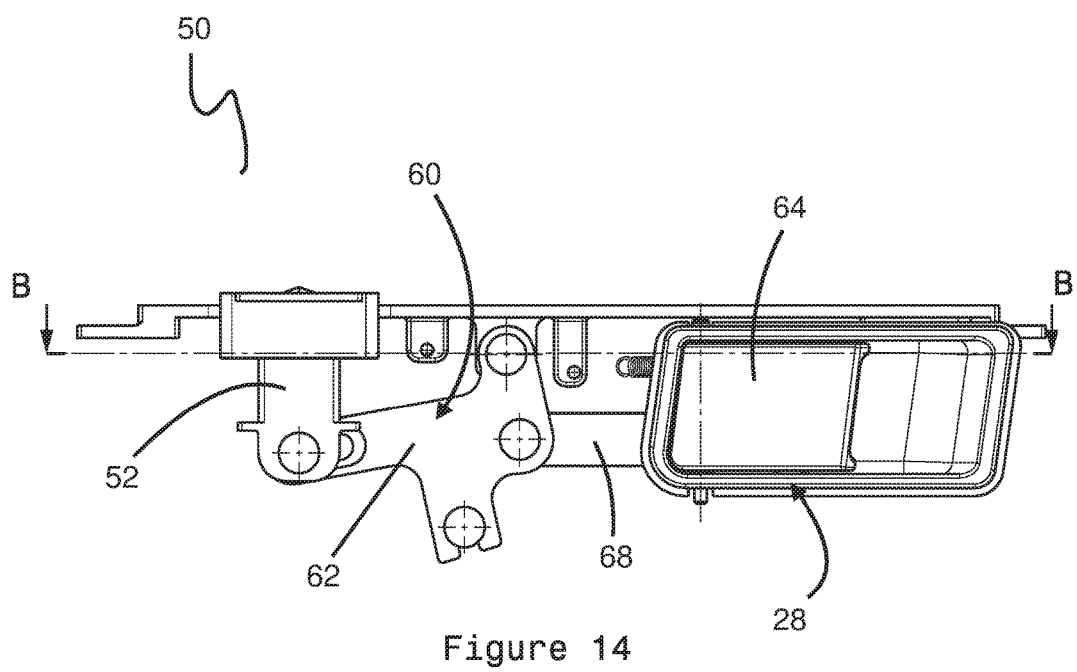
FIG. 14 is a side view of the locking apparatus in the non-locking state.
Figure 15:
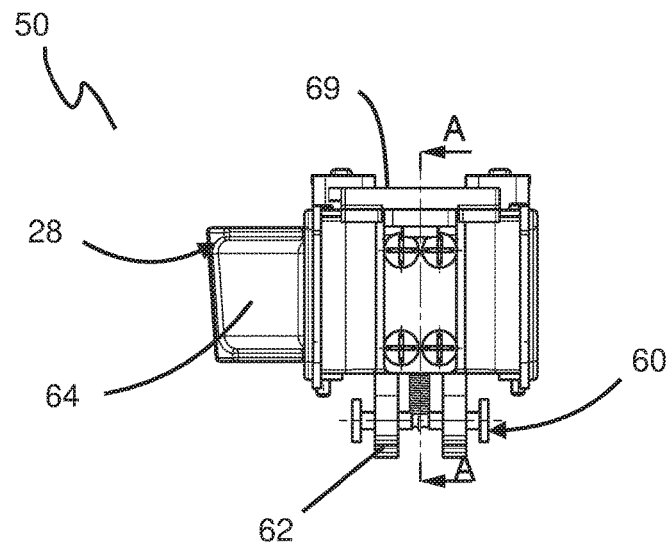
FIG. 15 is a front plan view of the locking apparatus in the non-locking state.
Figure 16:
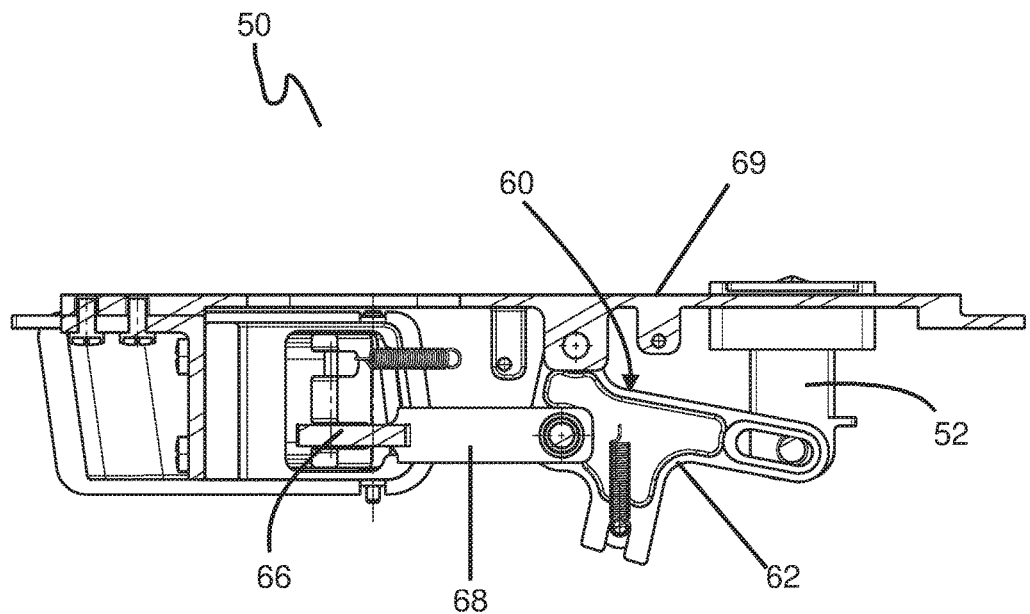
FIG. 16 is a side sectional view of the locking apparatus in the non-locking state.

In the open state the screen 26 may be located adjacent the upper wall section 34, i.e. it may slide alongside the wall section 34. To this end the screen 26 may be mounted on a rail or track that extends alongside the upper section 34 allowing the screen to slide between the open and closed states. However in some preferred embodiments the screen 26 is telescopically arranged with the first upper wall section 34 so that either it fits around the upper wall section 34 (as shown in FIGS. 3 and 8) or it fits into the upper wall section 34 (not illustrated) with the screen 26 and upper wall section being shaped and dimensioned accordingly. Alternatively the screen 26 may be telescopically arranged with the second upper wall section 36 (not shown) as above. In one preferred embodiment the screen 26 is slidable along the base wall 38. To facilitate movement of the screen 26, the screen 26 is coupled to the base 38 by a slide mechanism 40, one slide part 40A of which is provided on the base 38, the co-operating slide part 40B being provided on the screen 26. In the illustrated example, the slide part 40A includes a rail and the slide part 40B includes a formation in the base of the screen 26 for receiving the rail. Alternatively or in addition, one or more rollers or wheels may be provided to facilitate the sliding movement.

Figure 17:
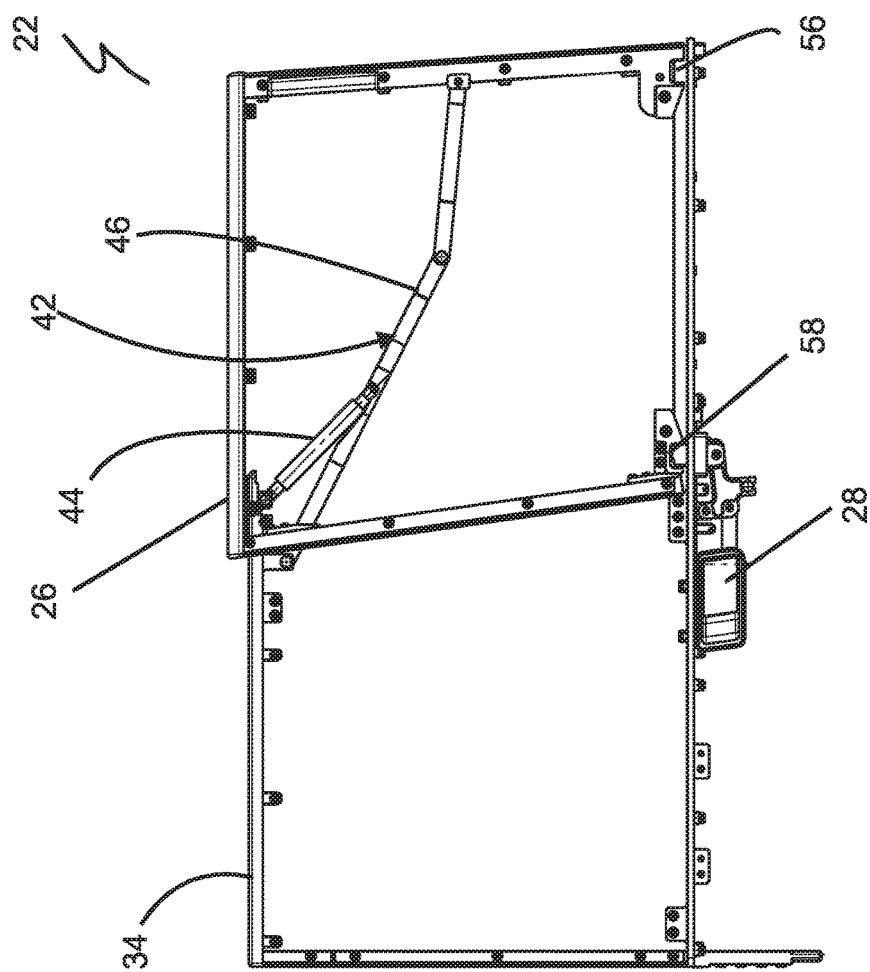
FIG. 17 is a side sectional view of the partition assembly in the closed state, showing an actuator.
Figure 18:
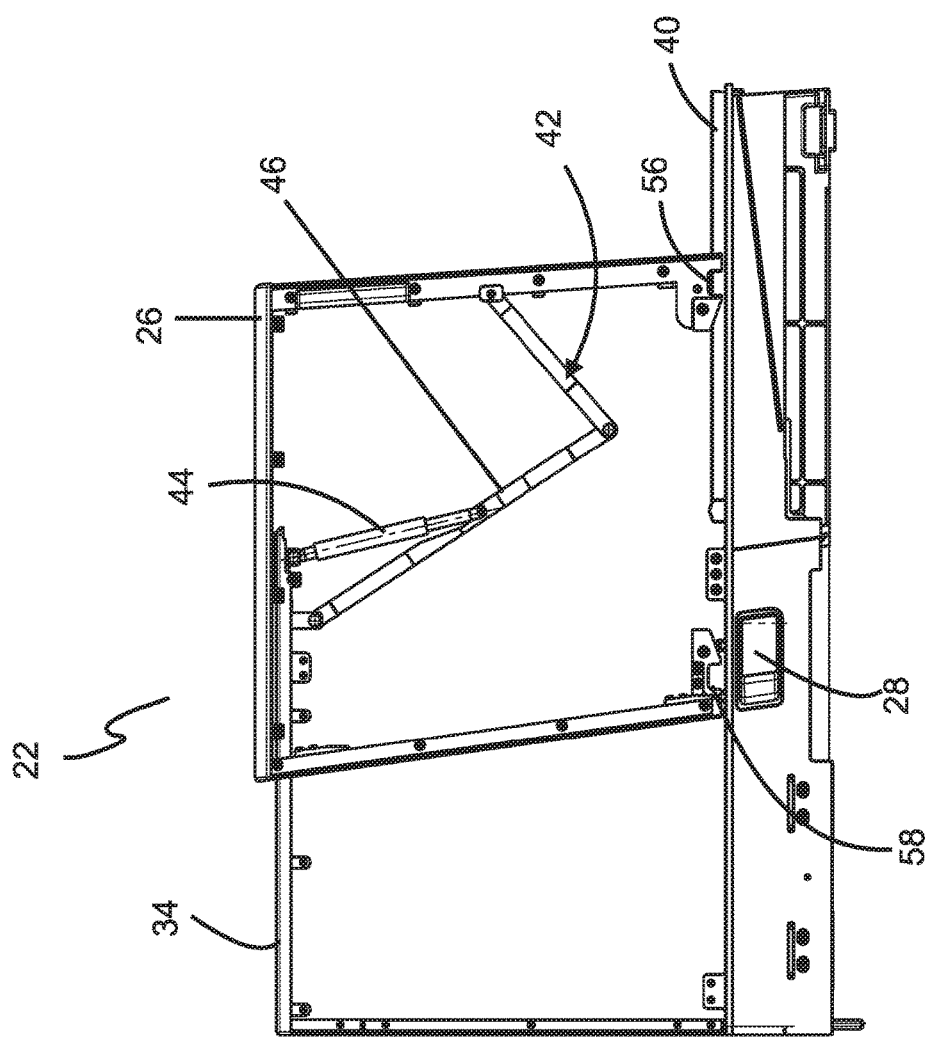
FIG. 18 is a side sectional view of the partition assembly in the partially open (or partially closed) state, showing the actuator therein.
Figure 19:
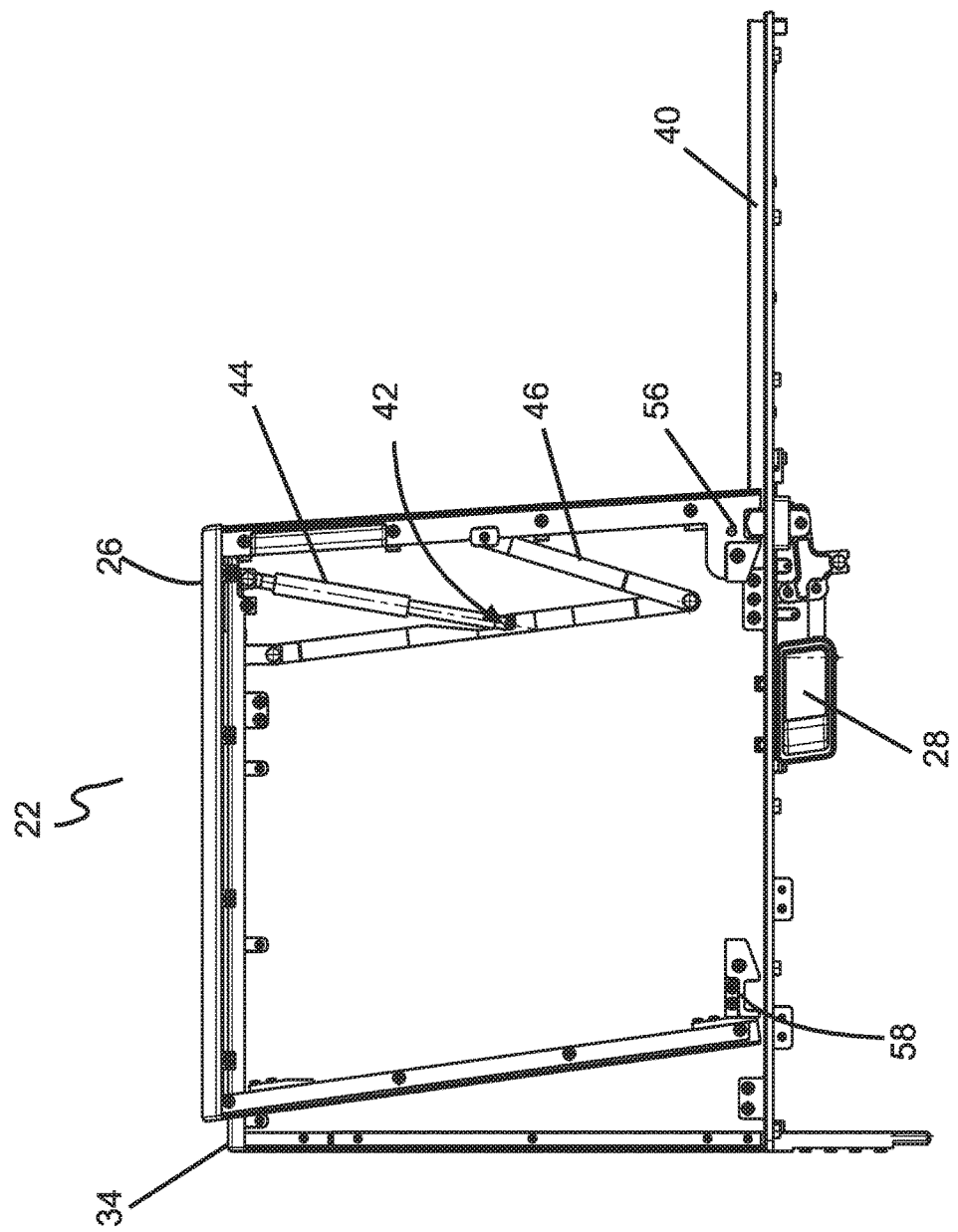
FIG. 19 is a side sectional view of the partition assembly in the closed position, showing the actuator.
Figure 20:
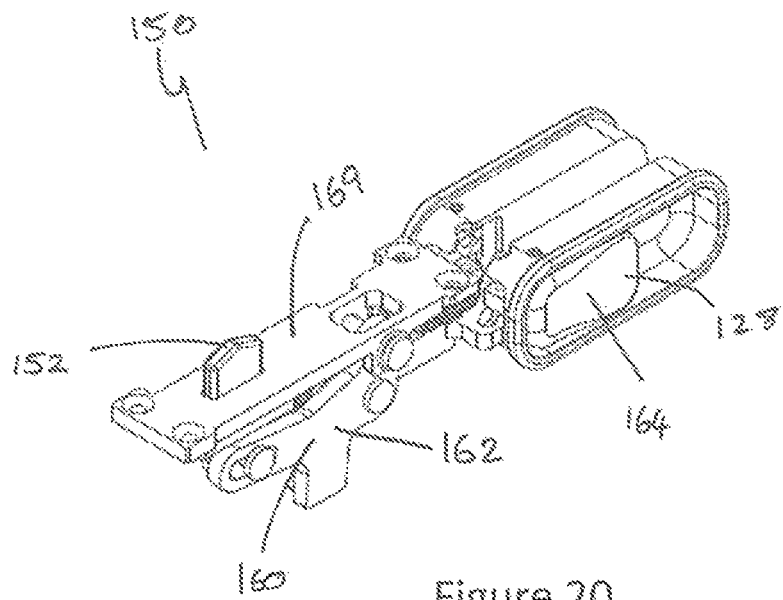
FIG. 20 is a top perspective view of an alternative embodiment of the locking apparatus.
Figure 21:
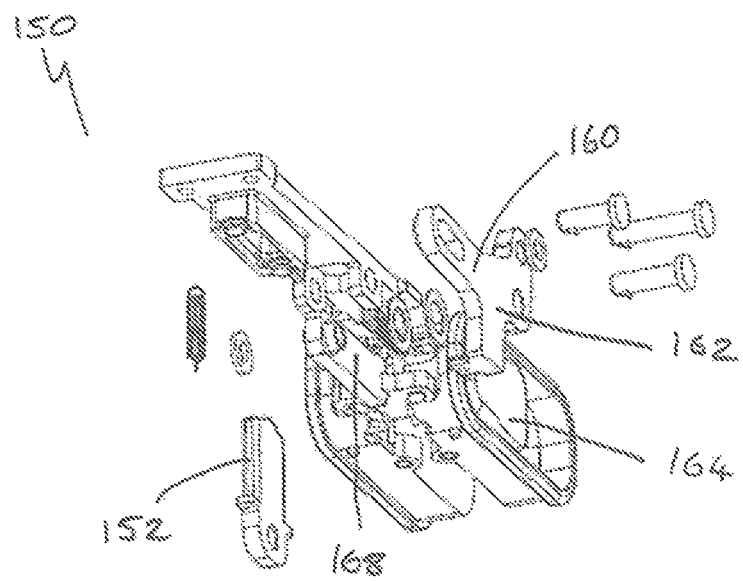
FIG. 21 is an exploded view of the alternative embodiment of the locking apparatus.
Figure 22:
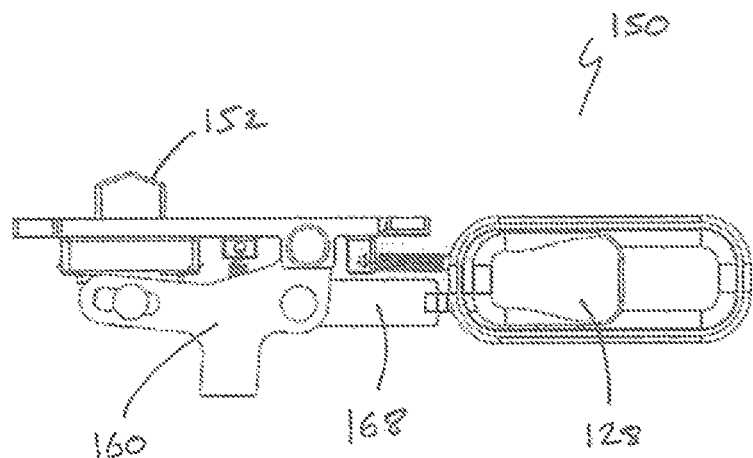
FIG. 22 is a side view of the alternative embodiment of the locking apparatus.
Figure 23:
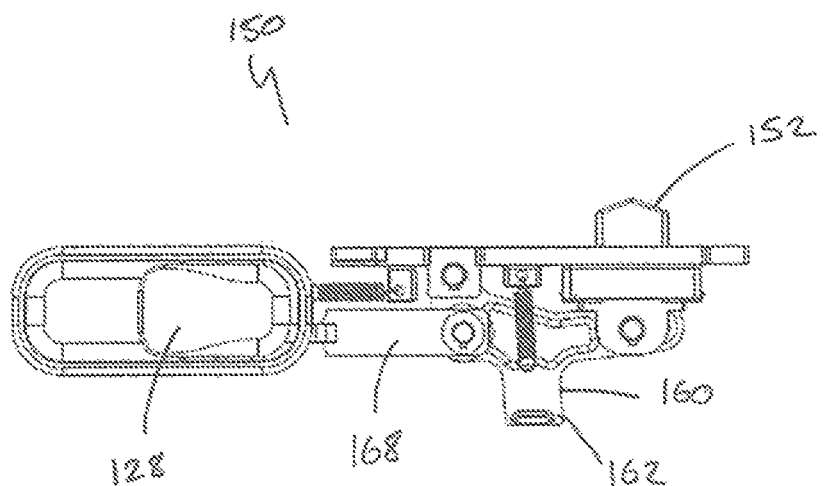
FIG. 23 is a side sectional view of the alternative embodiment of the locking apparatus.
Figure 24:
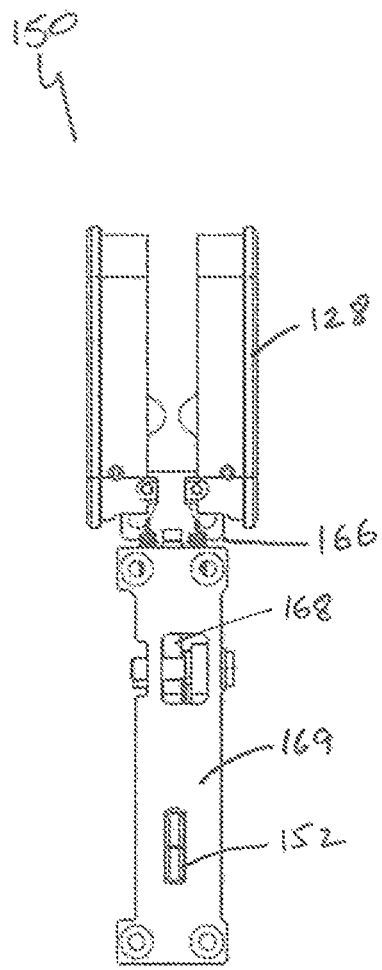
FIG. 24 is a top plan view of the alternative embodiment of the locking apparatus.
Figure 25:
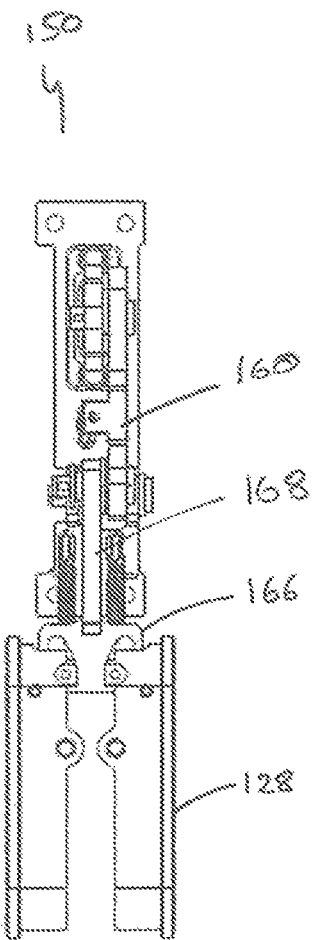
FIG. 25 is a bottom plan view of the alternative embodiment of the locking apparatus.
Figure 26:
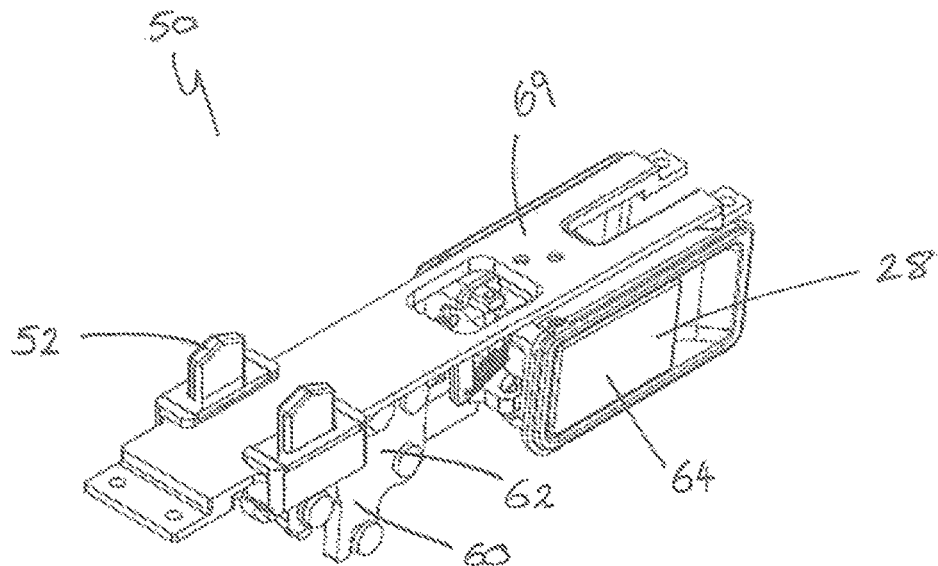
FIG. 26 is a top perspective view of the locking apparatus.
Figure 27:
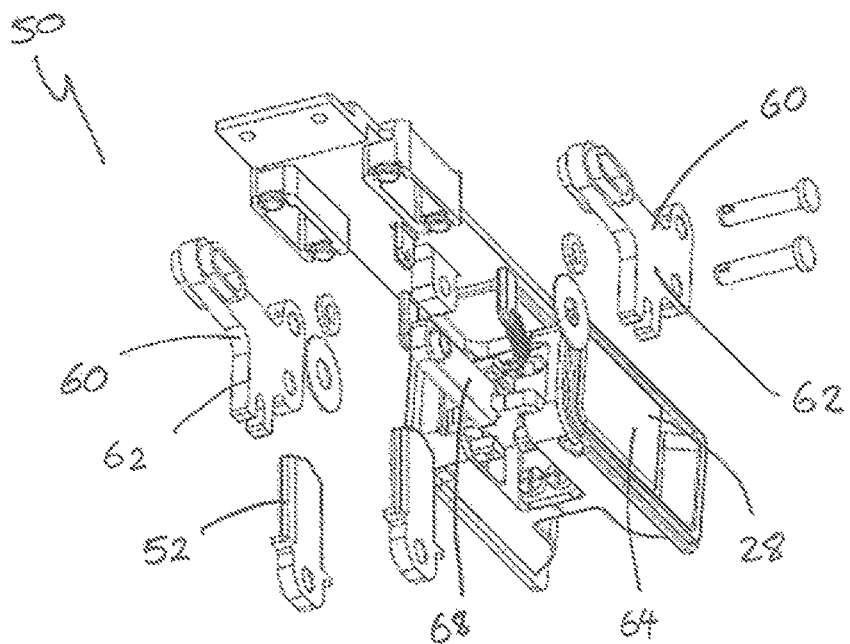
FIG. 27 is an exploded view of the locking apparatus.
Figure 28:
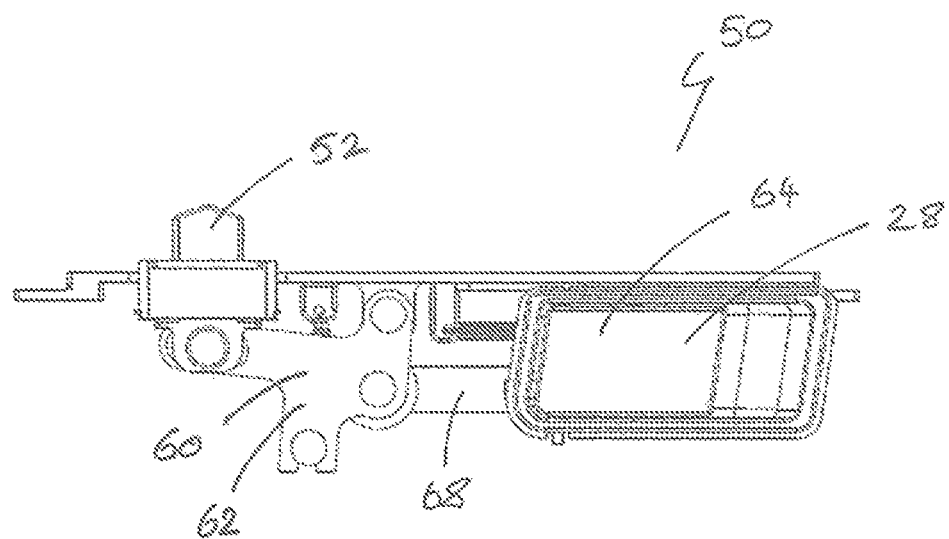
FIG. 28 is a side view of the locking apparatus.
Figure 29:
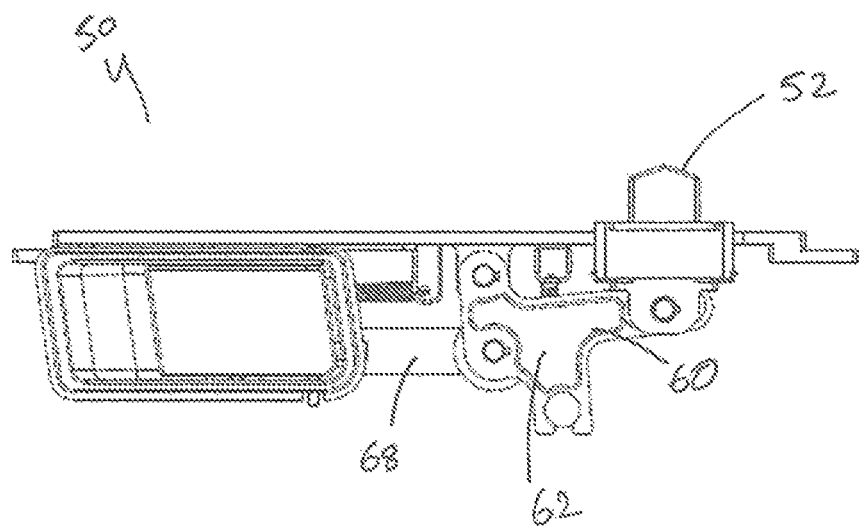
FIG. 29 is a side sectional view of the locking apparatus.
Figure 30:
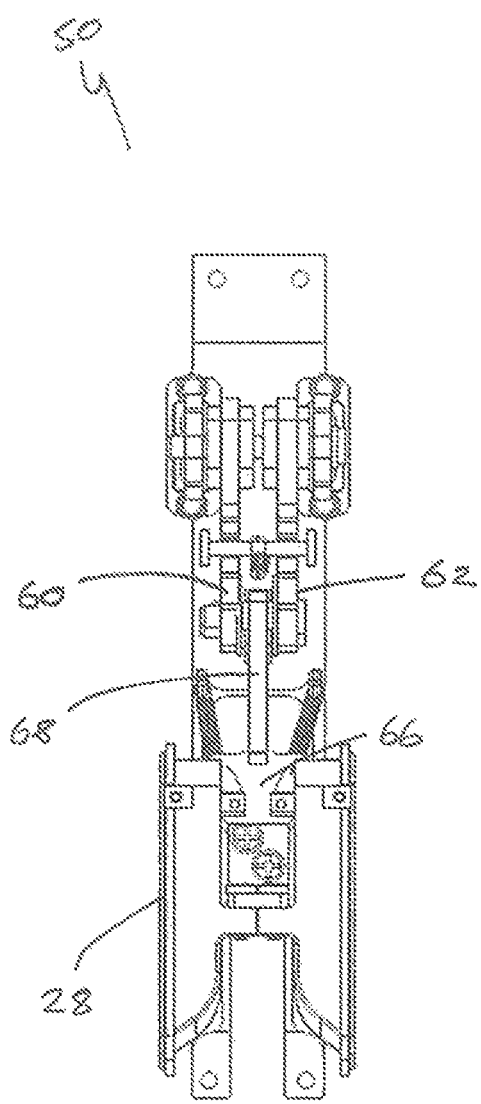
FIG. 30 is a bottom plan view of the locking apparatus.
Figure 31:
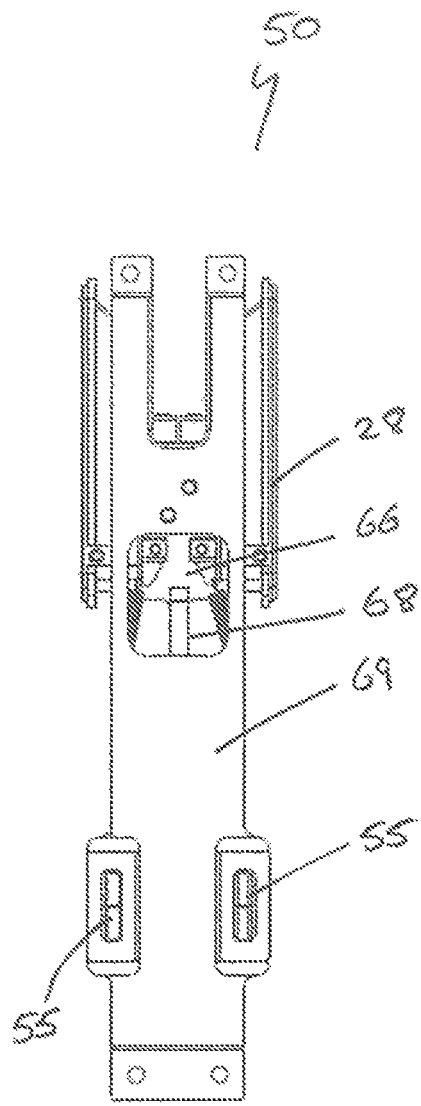
FIG. 31 is a top plan view of the locking apparatus.

With reference to the embodiments of FIGS. 17 to 19, the partition assembly 22 includes actuation mechanism 42 for moving the screen 26 from the open state to the closed state and/or the closed state to the open state. The actuation mechanism 42 is typically incorporated within the partition wall 24, typically within the upper portion 32 (including the screen 26). Optionally, the actuation mechanism is locatable within a compartment provided in the first upper wall section 34. Alternatively it may be locatable within a compartment provided in the second upper wall section 36. In either case, the actuation mechanism is also located, at least in part, within a compartment provided in the screen 26. The actuation mechanism 42 is coupled between the upper wall section and the screen 26 and, as can be seen by comparison of FIGS. 17 to 19, the extent to which the actuation mechanism 42 is within the upper wall section and the screen 26 depends on the location of the screen 26.

The actuation mechanism 42 may include an extendible actuator 44, which may be power-operable, e.g. a hydraulic ram, or resiliently operable, e.g. gas spring or mechanical (e.g. compression) spring, which may be coupled between the first upper wall section 34 and the screen 26. The actuator 44 is configured to effect or assist movement of the screen 26 from the open state to the closed state. In alternative embodiments, the actuator 44 may alternatively, or in addition, be configured to effect or assist movement of the screen 26 from the closed state to the open state. The actuator 44 may be biased to adopt its extended state, e.g. by hydraulic, gas, mechanical or other resilient biasing means. In the illustrated embodiments, in order to provide the desired travel for the screen 26, the actuator 44 is incorporated into an extendible linkage 46; whereby extension of the actuator 44 extends the linkage 46 to slide the screen 26 forward such that it adopts the closed state. The illustrated linkage 46 is pivotably coupled to the interior of the first upper wall section 34 and the screen 26.

In the illustrated embodiment, the actuating mechanism 42 is operable to move the screen from the open state to the closed state. In this example, this movement is effected or assisted by extension of the actuator 44. The screen 26 may be returned to the open state manually by a seat occupant, against the bias of the actuator 44 in the present example. Alternatively the actuating mechanism 42 is operable to move the screen from the closed state to the open state and may be returned to the open state manually by a seat occupant. In alternative embodiments the actuator 44 may be power operated (e.g. hydraulically, pneumatically or electrically operated) and double acting such that it is operable to slide the screen 26 between the open and closed states in both directions. Alternatively still, the screen 26 may be manually operable, i.e. the actuation mechanism 42 may be omitted.

In certain embodiments, at least one user operable control 28 is provided on the partition assembly 22 for operating the actuating mechanism 42 or for moving the screen manually as applicable. Conveniently the, or each, control 28 is incorporated into the base 38 and is accessible from a respective side of the partition wall 24. Typically a respective user operable control 28 is located at each sides of the partition wall 24. The user operable control 28 may be located in an easy to reach position on the partition wall 24, such that the seat 12 occupant may operate the control 28 when in a seated position. To this end the user operable control 28 is typically provided at or near arm rest level (as shown in FIGS. 1 and 2). As such the user operable control 28 may preferably be located on the upper portion 32; however in alternative embodiments it may be located upon the base portion 30 (not shown). In a further alternative embodiment the user operable control 28 may be located upon the screen 26 (not shown); in this embodiment it may include a knob or handle which the seat occupant may use to manually move the screen 26 between the open and closed states. The user operable control 28 may be coupled to the screen 26 via one or more linkages so that movement of the user operable control 28 in a direction parallel to the movement of the screen 26 causes a corresponding sliding movement of the screen 26 from the open to closed states or vice versa.

In embodiments where the control 28 is coupled to the actuation mechanism 42 for the operation thereof, the coupling may be such the control 28 operates a release mechanism that allows the actuation mechanism to operate under the bias of the actuator 44, or as an activation device for activating the actuator 44 where the actuator 44 is power operated (e.g. hydraulically, pneumatically or electrically operated).

In one preferred embodiment as illustrated in the accompanying drawings, in particular FIGS. 9A to 19, the user operable control 28 is coupled to a locking apparatus 50 which is configured to selectively retain the partition assembly 22, more specifically the screen 26, in its open state or closed state. In the illustrated embodiment, the locking apparatus 50 selectably holds the screen 26 in its open state against the bias of the actuator 44 which is biased to adopt its extended state and wherein extension of the actuator 44 causes the screen 26 to close. The locking apparatus 50 is operable between a locking state, in which it prevents movement of the screen with respect to the partition wall 24, and a non-locking state in which it allows movement of the screen with respect to the partition wall 24. In embodiments where the actuator 44 is double-acting and power operated the locking mechanism may be omitted and the control 28 may be linked (e.g. electrically, hydraulically and/or mechanically as appropriate) to the actuator 44 in order to control the extension and retraction of the actuator and so to control opening and closing of the screen 26.

As shown in FIGS. 17 to 19 the locking apparatus 50 may be provided within the partition wall 24, such as within the upper portion 32. The locking apparatus typically has at least one latch 52. In the embodiment shown two latches 52 are provided. The latches 52 are extendable and retractable with respect to the base 38 to effect the locking and non-locking states of the locking apparatus 50. The latches 52 are typically extendable from the base wall 38 in a direction which is perpendicular to the direction of the slidable movement of the screen 26. The latches 52 are configured to selectively engage the screen 26. To this end one or more recesses 54 or any other suitable latch-receiving formation is provided on the screen 26, conveniently on its underside. Advantageously, the recesses 54 are typically located in the underside of screen 26 such that when the latches 52 engage therein the screen 26 is retained in the open or closed state or in one or more intermediate states therebetween such as partially open or partially closed. The recesses 54 are typically shaped and dimension to accommodate the latches 52 or vice versa. There may be at least two recesses 54, the first and second recesses 56, 58 are preferably located at opposing ends of the underside of the screen 26 with the first recess 56 being located upon the end adjacent the opening 25 and the second recess 58 being located at the end adjacent the first upper wall section 34. The first and second recesses 56, 58 typically extend transverse the width of the screen 26 however alternatively the first and second recesses 56, 58 may include respective pairs of recesses within which the latches 52 may extend.

The latches 52 are extendable and retractable to effect the locking and non-locking states by the user operable control 28 which is coupled to the latches by a latch operating mechanism 60 for this purpose. The latch operating mechanism 60 may be mechanical, electrical or electro-mechanical as is convenient. In the illustrated embodiment the mechanism 60 comprises a mechanical linkage. It will be understood that the mechanical linkage 60 may take any suitable configuration. However, in the illustrated embodiment the latch operating mechanism 60 includes a lever 62 that is pivotable by the user operable control 28, which is configured to extend or retract the latches 52. The latch operating mechanism 60 may be biased such that the latches 52 adopt their extended states e.g. by hydraulic, gas, mechanical or other resilient biasing means. In the illustrated embodiment, the user operable control 28 includes a pivoting catch 64, which is configured to engage a pivoting member 66 which is in turn coupled via a rod 68 or other suitable mechanical linkage to the lever 62. The pivoting member 66 is configured to move such as to vary the position of the rod 68 such that the lever 62 effects the extended or retraced states, see in particular FIGS. 10A to 10C. The rod 68 is biased towards the locking state via one or more resilient biasing means which are coupled to an upper wall 69 of the locking apparatus 50. The rod 68 is slidably coupled to the lever 62 at one end and fixedly coupled to the pivoting member 66 at the opposing end. The pivoting member 66 is shaped and dimensioned to incorporate one or more apertures 70, within which at least part of the user operable control 28, such as the pivoting catch 64, may displace. To this end, upon actuation of the user operable control 28, the pivoting catch 64 is configured to displace whereupon it may abut a wall defined within the pivoting member 66 by the aperture 70, the pivoting member 66 being configured to pivot along a horizontal axis. The rod 68 is configured to correspondingly displace in conjunction with the pivoting member 66 such as to vary the lever 62 and latches between locking and non-locking states. For example in the locking state the rod 68 typically extends centrally from the pivoting member 66 where it pushes against the lever 62 such as to vary the latches 52 into the locking state. Alternatively in the non-locking state the rod 68 typically extends askew the lever 62 such that the latches retract as the rod does not positively engage the lever 62.

As is illustrated there is typically provided a user operable control 28 upon either side of the locking apparatus 50, both being configured to vary the locking apparatus 50 between locking and non-locking states, to this end both are typically pivotably coupled to the same pivoting member 66 with the pivoting member 66 incorporating respective apertures 70 within which at least part of the pivoting catch 64 of each respective control 28 may displace.

An alternative embodiment of the locking apparatus 150 is shown in FIGS. 20 to 25. The locking apparatus 150 includes one latch which is located centrally upon the upper wall 169, extends and retracts therefrom. The latch 152 is extendable and retractable with respect to the base 38 to effect the locking and non-locking states of the locking apparatus 150. The latch 152 is typically extendable from the base wall 38 in a direction which is perpendicular to the direction of the slidable movement of the screen 26. The latch 152 is configured to selectively engage the screen 26. To this end the latch 152 is extendable and retractable to effect the locking and non-locking states by the user operable control 128 which is coupled to the latch by a latch operating mechanism 160 for this purpose. The latch operating mechanism 160 may be mechanical, electrical or electro-mechanical as is convenient. In the illustrated embodiment the mechanism 160 comprises a mechanical linkage. It will be understood that the mechanical linkage 160 may take any suitable configuration. However, in the illustrated embodiment the latch operating mechanism 160 includes a lever 162 that is pivotable by the user operable control 128, which is configured to extend or retract the latch 152. The latch operating mechanism 160 may be biased such that the latch 152 adopt its extended state e.g. by hydraulic, gas, mechanical or other resilient biasing means. In the illustrated embodiment, the user operable control 128 includes a pivoting catch 164, which is configured to engage a pivoting member 166 which is in turn coupled via a rod 168 or other suitable mechanical linkage to the lever 162. The pivoting member 166 is configured to move such as to vary the position of the rod 168 such that the lever 162 effects the extended or retraced states, see in particular FIGS. 22 and 23. The rod 168 is biased towards the locking state via one or more resilient biasing means which are coupled to an upper wall 169 of the locking apparatus 150. The rod 168 is slidably coupled to the lever 162 at one end and fixedly coupled to the pivoting member 166 at the opposing end. The pivoting member 166 is shaped and dimensioned to incorporate one or more apertures 170, within which at least part of the user operable control 128, such as the pivoting catch 164, may displace. To this end, upon actuation of the user operable control 128, the pivoting catch 164 is configured to displace whereupon it may abut a wall defined within the pivoting member 166 by the aperture 170, the pivoting member 166 being configured to pivot along a horizontal axis. The rod 168 is configured to correspondingly displace in conjunction with the pivoting member 166 such as to vary the lever 162 and latch 152 between locking and non-locking states. For example in the locking state the rod 168 typically extends centrally from the pivoting member 166 where it pushes against the lever 162 such as to vary the latch 52 into the locking state. Alternatively in the non-locking state the rod 168 typically extends askew the lever 162 such that the latch retracts as the rod 168 does not positively engage the lever 162.

As is illustrated there is typically provided a user operable control 128 upon either side of the locking apparatus 150, both being configured to vary the locking apparatus 150 between locking and non-locking states, to this end both are typically pivotably coupled to the same pivoting member 166 with the pivoting member 166 incorporating respective apertures 170 within which at least part of the pivoting catch 164 of each respective control 28 may displace.

In-use the partition assembly 22 is retained in the open state via the engagement of the locking apparatus 50, 150 with the screen 26, more particularly with the latches 52 or latch 152 engaging with the recess 56 provided on the underside of the screen 26, the locking apparatus 50, 150 being biased towards an locking state. Upon activation of the user operable control 28, 128 provided on either side of the partition wall 24, the locking apparatus 50, 150 is configured to adopt the non-locking state. The actuation mechanism 42, which is typically biased towards its extended state, is configured to slidably move the screen 26 into the opening 25 such that the partition assembly 22 adopts the closed state. Upon extension of the screen 26 into the close state, the user may release the user operable control 28, 128 such that the locking apparatus 50, 150 adopts the locking state, with the latches 52 or latch 152 engaging with the second recess 58 provided on the underside of the screen 26, thereby securing the part assembly 22 in the closed state. Advantageously, when the partition assembly 22 is in the closed state the locking apparatus 50, 150 and the coupling between the screen 26 and the first upper wall section 34 prevent lateral movement of the screen 26 with respect to the partition wall 24.

The invention is not limited to the embodiment(s) described herein but can be amended or modified without departing from the scope of the present invention, which is intended to be limited only by the scope of the appended claims as interpreted according to the principles of patent law including the doctrine of equivalents.

The invention claimed is:

1. Passenger seating comprising at least one seating row, each seating row comprising at least one seat beside which a partition assembly is located, wherein the partition assembly comprises:
    a partition wall located at a side of the at least one seat, the wall defining an opening wherein the partition wall comprises an upper portion and a base portion; wherein the upper portion comprises a base, the base being located below the opening and the screen;
    a screen that is slidably movable with respect to the wall between an open state in which the opening is exposed by the screen, and a closed state in which the opening is closed by the screen; and
    a locking apparatus operable between locking and non-locking states in which the locking apparatus, respectively, prevents or allows the movement of the screen;
    wherein the locking apparatus comprises at least one latch which is extendable from the base to engage with the screen.

2. The passenger seating of claim 1, wherein the at least one seat comprises a first seat located beside a second seat, the partition assembly and the partition wall being located between the first and second seats.

3. The passenger seating of claim 1, wherein the at least one seat is located at an end of the respective seating row, the partition assembly and partition wall being located at the end of the respective seating row.

4. The passenger seating of claim 1, wherein the partition wall extends perpendicular to a floor on which the seating is installed; wherein the partition wall extends to at least the height of a top of the at least one seats.

5. The passenger seating of claim 4, wherein the opening is provided in the upper portion and wherein the upper portion includes a first upper wall section adjacent the opening, the first upper wall section forming a forward part of the upper portion of the partition wall; and wherein the upper portion comprises a second upper wall section adjacent the opening, wherein the second upper wall section provides a rear part of the upper portion of the partition wall.

6. The passenger seating of claim 5, wherein the upper portion comprises a base, the base being located below the opening and the screen.

7. The passenger seating of claim 6, wherein the screen is slidable along the base.

8. The passenger seating of claim 7 wherein the upper portion includes at least one rail along which the screen is slidable.

9. The passenger seating of claim 5, wherein the upper portion comprises a base, the base being located below the opening and the screen and wherein the rail is provided on the base.

10. The passenger seating of claim 1, wherein the screen is slidable in a direction that is parallel with the direction in which a seated passenger faces; and wherein a slide mechanism comprising one or more roller(s) or wheel(s) or rails is provided between the screen and the wall to facilitate the sliding movement of the screen.

11. The passenger seating of claim 1, wherein the partition assembly includes an actuation mechanism for moving the screen between the open state and the closed state.

12. The passenger seating of claim 11, wherein the upper portion includes a first upper wall section adjacent the opening, and wherein the actuation mechanism is partly incorporated within first upper wall section and partly within the screen.

13. The passenger seating of claim 11, wherein the actuation mechanism comprises an extendible actuator, wherein the actuator is coupled to an extendible linkage whereby extension of the actuator extends the linkage to thereby slide the screen.

14. The passenger seating of claim 13, wherein the linkage is pivotably coupled to an interior of the first upper wall section and to the screen.

15. The passenger seating of claim 11, including at least one user operable control for operating the actuation mechanism.

16. The passenger seating of claim 1, including at least one user operable control for moving the screen manually between the open and closed states wherein the user operable control is coupled to the locking apparatus to operate the locking apparatus between a locking state and a non-locking state.

17. The passenger seating of claim 1, wherein the at least one latch extends from the base in a direction which is perpendicular to the direction of the slidable movement of the screen; and wherein the at least one latch, when extended, engages with a formation in an underside of the screen to effect a locking state.

18. The passenger seating of claim 17, wherein the user operable control is coupled to the at least one latch to move the at least one latch between its extended and retracted states; wherein the user operable control is coupled to the at least one latch by a latch operating mechanism comprising a mechanical linkage; wherein the latch operating mechanism comprises a lever that is pivotable by the user operable control to extend or retract the at least one latch; wherein the at least one latch is biased to adopt an extended state; and wherein the user operable control comprises a pivoting catch configured to engage a pivoting member that is coupled via another mechanical linkage to the lever.

19. Passenger seating comprising at least one seating row, each seating row comprising at least one seat beside which a partition assembly is located, wherein the partition assembly comprises:
   a partition wall located at a side of the at least one seat, the wall including an opening;
   a screen that is slidably movable with respect to the wall between an open state in which the opening is exposed by the screen, and a closed state in which the opening is closed by the screen;
   wherein the partition wall comprises an upper portion and a base portion;
   wherein the upper portion includes a first upper wall section adjacent the opening; and
   wherein the screen is telescopically arranged with respect to the first upper wall section so that the screen fits around the upper wall section or within the upper wall section.

20. Passenger seating comprising at least one seating row, each seating row comprising at least one seat beside which a partition assembly is located, wherein the partition assembly comprises:
   a partition wall located at a side of the at least one seat, the wall including an opening;
   a screen that is slidably movable with respect to the wall between an open state in which the opening is exposed by the screen, and a closed state in which the opening is closed by the screen;
   an actuation mechanism for moving the screen from the open state to the closed state and/or from the closed state to the open state; and
   wherein the actuation mechanism comprises an extendible actuator.

* * * * *